United States Patent
Gansler et al.

(10) Patent No.: US 10,696,416 B2
(45) Date of Patent: *Jun. 30, 2020

(54) PROPULSION SYSTEM FOR AN AIRCRAFT

(71) Applicant: General Electric Company, Schenectady, NY (US)

(72) Inventors: Michael Thomas Gansler, Mason, OH (US); Robert Charles Hon, Fort Mitchell, KY (US)

(73) Assignee: General Electric Company, Schenectady, NY (US)

(*) Notice: Subject to any disclaimer, the term of this patent is extended or adjusted under 35 U.S.C. 154(b) by 245 days.

This patent is subject to a terminal disclaimer.

(21) Appl. No.: 15/639,200

(22) Filed: Jun. 30, 2017

(65) Prior Publication Data
US 2019/0002116 A1 Jan. 3, 2019

(51) Int. Cl.
B64D 27/10 (2006.01)
B64D 27/24 (2006.01)
(Continued)

(52) U.S. Cl.
CPC ............ B64D 31/06 (2013.01); B64D 27/02 (2013.01); B64D 27/10 (2013.01); B64D 27/24 (2013.01); F01D 11/20 (2013.01); F02C 6/14 (2013.01); F02C 9/26 (2013.01); F02K 5/00 (2013.01); B64D 2027/026 (2013.01);
(Continued)

(58) Field of Classification Search
CPC ........ B64D 27/02; B64D 27/10; B64D 27/24; B64D 2027/026; B64D 31/06; F01D 11/20; F02C 3/04; F02C 6/14; F02C 9/26; F05D 2220/323; F05D 2220/76; F05D 2240/35; F05D 2270/304; F05D 2270/303; F05D 2270/04; F02K 5/00; Y10S 903/903

See application file for complete search history.

(56) References Cited

U.S. PATENT DOCUMENTS 4,792,906 A    12/1988  King et al.
5,090,193 A    2/1992   Schwarz et al.
(Continued)

FOREIGN PATENT DOCUMENTS

DE    102013209388 A1    11/2014
DE    112015001403 T5    12/2016
(Continued)

OTHER PUBLICATIONS

European Search Report Corresponding to EP Application 18179740 dated Sep. 14, 2018.
(Continued)

*Primary Examiner* — Jerrah Edwards
(74) *Attorney, Agent, or Firm* — Dority & Manning, P.A.

(57) ABSTRACT

A hybrid-electric propulsion system includes a propulsor, a turbomachine, and an electrical system, the electrical system including an electric machine coupled to the turbomachine. A method for operating the propulsion system includes operating, by one or more computing devices, the turbomachine such that the turbomachine rotates the propulsor; receiving, by the one or more computing devices, a command to accelerate the turbomachine while operating the turbomachine; and providing, by the one or more computing devices, electrical power to the electric machine to add power to the turbomachine, the propulsor, or both in response to the received command to accelerate the turbomachine.

20 Claims, 12 Drawing Sheets

(51) Int. Cl.
*B64D 31/06* (2006.01)
*F01D 11/20* (2006.01)
*F02C 9/26* (2006.01)
*B64D 27/02* (2006.01)
*F02C 6/14* (2006.01)
*F02K 5/00* (2006.01)
*F02C 3/04* (2006.01)

(52) U.S. Cl.
CPC .......... *F02C 3/04* (2013.01); *F05D 2220/323* (2013.01); *F05D 2220/76* (2013.01); *F05D 2240/35* (2013.01); *F05D 2270/04* (2013.01); *F05D 2270/303* (2013.01); *F05D 2270/304* (2013.01); *Y10S 903/903* (2013.01)

(56) References Cited

U.S. PATENT DOCUMENTS

| | | | |
|---|---|---|---|
| 5,325,042 | A | 6/1994 | Murugan |
| 5,574,647 | A | 11/1996 | Liden |
| 6,474,603 | B1 | 11/2002 | Kinkead et al. |
| 6,979,979 | B2 | 12/2005 | Xu et al. |
| 7,328,577 | B2 | 2/2008 | Stewart et al. |
| 7,690,205 | B2 | 4/2010 | Delaloye et al. |
| 8,010,250 | B2 | 8/2011 | Borumand et al. |
| 8,311,687 | B2 | 11/2012 | Bakker |
| 8,615,335 | B2 | 12/2013 | Couey et al. |
| 8,645,009 | B2 | 2/2014 | Klooster |
| 8,713,946 | B2 | 5/2014 | Botarelli |
| 8,904,972 | B2 | 12/2014 | Kumar et al. |
| 9,008,942 | B2 | 4/2015 | Dyrla et al. |
| 9,051,881 | B2 | 6/2015 | Bettner |
| 9,140,195 | B2 | 9/2015 | Botarelli |
| 9,146,545 | B2 | 9/2015 | Stewart |
| 9,157,372 | B2 | 10/2015 | Sowden |
| 9,200,591 | B2 | 12/2015 | Du et al. |
| 9,209,721 | B2 | 12/2015 | Solodovnik et al. |
| 9,428,267 | B2 | 8/2016 | DeVita et al. |
| 9,429,078 | B1 | 8/2016 | Crowe et al. |
| 9,488,109 | B2 | 11/2016 | Sowden |
| 9,564,056 | B1 | 2/2017 | Ghaemi et al. |
| 2008/0276620 | A1 | 11/2008 | Ullyott et al. |
| 2012/0209456 | A1 | 8/2012 | Harmon et al. |
| 2013/0233977 | A1 | 9/2013 | Smiley et al. |
| 2015/0100181 | A1 | 4/2015 | Strauss et al. |
| 2015/0142216 | A1 | 5/2015 | Tillman et al. |
| 2015/0285165 | A1 | 10/2015 | Steinwandel et al. |
| 2015/0367950 | A1 | 12/2015 | Rajashekara et al. |
| 2016/0023773 | A1 | 1/2016 | Himmelmann et al. |
| 2016/0075224 | A1 | 3/2016 | Miu et al. |
| 2016/0194087 | A1 | 7/2016 | Nalim |
| 2016/0304211 | A1 | 10/2016 | Swann |
| 2016/0325629 | A1 | 11/2016 | Siegel et al. |
| 2017/0002744 | A1 | 1/2017 | Poumarede et al. |
| 2017/0057650 | A1 | 3/2017 | Walter-Robinson |
| 2017/0058785 | A1 | 3/2017 | Laskowski |
| 2017/0096233 | A1 | 4/2017 | Mercier-Calvairac et al. |
| 2017/0226934 | A1 | 8/2017 | Robic et al. |
| 2017/0247114 | A1 | 8/2017 | Moulon et al. |
| 2018/0127104 | A1 | 5/2018 | Kobayashi et al. |

FOREIGN PATENT DOCUMENTS

| | | |
|---|---|---|
| EP | 2636596 A2 | 9/2013 |
| EP | 2985901 A1 | 2/2016 |
| WO | WO2014/158240 A2 | 10/2014 |
| WO | WO2016/020618 A1 | 2/2016 |
| WO | WO2016/062945 A1 | 4/2016 |

OTHER PUBLICATIONS

European Search Report Corresponding to EP Application 18179869 dated Oct. 17, 2018.
European Search Report Corresponding to EP Application 18179872 dated Oct. 5, 2018.
European Search Report Corresponding to EP Application 18179873 dated Oct. 5, 2018.

PROPULSION SYSTEM FOR AN AIRCRAFT

FIELD

The present subject matter relates generally to a hybrid-electric propulsion system, and a method for increasing an acceleration of a turbomachine of the hybrid electric propulsion system.

BACKGROUND

A conventional commercial aircraft generally includes a fuselage, a pair of wings, and a propulsion system that provides thrust. The propulsion system typically includes at least two aircraft engines, such as turbofan jet engines. Each turbofan jet engine is typically mounted to a respective one of the wings of the aircraft, such as in a suspended position beneath the wing, separated from the wing and fuselage.

Generally, the turbofan jet engines may be operated in a manner to provide an ability to relatively quickly increase or decrease an amount of thrust output of the engines. For example, prior to a takeoff of the aircraft, the turbofan jet engines are operated at an idle setpoint wherein the turbofan jet engines produce a minimal amount of thrust. Notably, however, the idle setpoint is typically set higher than would otherwise be desirable from a fuel consumption and thrust generation standpoint in order to allow the turbofan jet engines to accelerate relatively quickly when the aircraft is set to takeoff. While setting the idle setpoint at this higher level provides the benefit of increased acceleration at takeoff, it may result in the turbofan jet engines consuming more fuel than is desired and further generating more thrust than is necessary. The higher than desired level of thrust may result in premature wear of the brakes of the aircraft during, e.g., taxiing operations.

Additionally, when operating in a steady state operating condition during flight, active clearance control systems of the turbofan jet engines may close down, or tighten up, clearances within, e.g., respective turbine sections of the turbofan jet engines. As will be appreciated, tightening up the clearances may increase an efficiency of the turbofan jet engines. However, these clearances are not kept as close as would otherwise be desired in order to enable the turbofan jet engines to relatively quickly increase an effective power output if desired. More specifically, these clearances are not kept as close as would otherwise be desired in order to allow the components within the turbofan jet engines to expand radially outwardly if need in response to a command to accelerate the turbofan jet engines (the expansion resulting from, e.g., an increased rotational speed, and/or an increased temperature to which the components are exposed).

Accordingly, a propulsion system for an aircraft capable of operating turbomachines in an efficient manner would be useful.

BRIEF DESCRIPTION

Aspects and advantages of the invention will be set forth in part in the following description, or may be obvious from the description, or may be learned through practice of the invention.

In an exemplary aspect of the present disclosure, a method for operating a hybrid-electric propulsion system of an aircraft is provided. The hybrid-electric propulsion system includes a propulsor, a turbomachine, and an electrical system, the electrical system including an electric machine coupled to the turbomachine. The method includes operating, by one or more computing devices, the turbomachine such that the turbomachine rotates the propulsor; receiving, by the one or more computing devices, a command to accelerate the turbomachine while operating the turbomachine; and providing, by the one or more computing devices, electrical power to the electric machine to add power to the turbomachine, the propulsor, or both in response to the received command to accelerate the turbomachine.

In certain exemplary aspects the hybrid electric propulsion system further includes an electric energy storage unit, wherein providing, by the one or more computing devices, electrical power to the electric machine includes providing, by the one or more computing devices, electrical power to the electric machine from the electric energy storage unit.

For example, in certain exemplary aspects providing, by the one or more computing devices, electrical power to the electric machine from the electric energy storage unit includes providing, by the one or more computing devices, at least about fifteen horsepower of mechanical power to the turbomachine, the propulsor, or both with the electric machine.

In certain exemplary aspects operating, by the one or more computing devices, the turbomachine includes operating, by the one or more computing devices, the turbomachine in a steady-state flight operating condition.

For example, in certain exemplary aspects the method further includes maintaining, by the one or more computing devices, a fuel flow to a combustion section of the turbomachine substantially constant for an initial time period in response to the received command to accelerate the turbomachine.

For example, in certain exemplary aspects maintaining, by the one or more computing devices, the fuel flow to the combustion section of the turbomachine substantially constant for the initial time period includes maintaining a rotational speed of a high pressure system of the turbomachine substantially constant for the initial time period, maintaining a temperature within the turbomachine substantially constant for the initial time period, or both.

For example, in certain exemplary aspects the method further includes increasing, by the one or more computing devices, one or more clearances within the turbomachine using an active clearance control system of the turbomachine in response to the received command to accelerate the turbomachine.

For example, in certain exemplary aspects the method further includes maintaining, by the one or more computing devices, a fuel flow to a combustion section of the turbomachine substantially constant for an initial time period in response to the received command to accelerate the turbomachine, and wherein increasing, by the one or more computing devices, the one or more clearances within the turbomachine using the active clearance control system includes increasing, by the one or more computing devices, the one or more clearances within the turbomachine using the active clearance control system substantially simultaneously with maintaining, by the one or more computing devices, the fuel flow to the combustion section of the turbomachine substantially constant for the initial time period.

For example, in certain exemplary aspects increasing, by the one or more computing devices, the one or more clearances within the turbomachine using the active clearance control system includes increasing, by the one or more computing devices, the one or more clearances within the turbomachine using the active clearance control system substantially simultaneously with providing, by the one or more computing devices, electrical power to the electric machine.

For example, in certain exemplary aspects operating, by one or more computing devices, the turbomachine in the steady-state flight operating condition includes extracting, by the one or more computing devices, electrical power from the electric machine.

In certain exemplary aspects operating, by the one or more computing devices, the turbomachine includes operating, by the one or more computing devices, the turbomachine in an idle operating condition.

For example, in certain exemplary aspects receiving, by the one or more computing devices, the command to accelerate the turbomachine while operating the turbomachine in the idle operating condition includes receiving, by the one or more computing devices, a command to accelerate the turbomachine to a takeoff power level while operating the turbomachine in the idle operating condition.

For example, in certain exemplary aspects, by the one or more computing devices, the command to accelerate the turbomachine while operating the turbomachine in the idle operating condition includes receiving, by the one or more computing devices, a thrust increase command.

For example, in certain exemplary aspects receiving, by the one or more computing devices, the command to accelerate the turbomachine further includes determining, by the one or more computing devices, a rate of change of commanded thrust increase, and wherein providing, by the one or more computing devices, electrical power to the electric machine includes modulating, by the one or more computing devices, an amount of electrical power provided to the electric machine based at least in part on the determined rate of change of commanded thrust increase.

In certain exemplary aspects the method further includes receiving, by the one or more computing devices, data indicative of an operational parameter of the turbomachine, and wherein providing, by the one or more computing devices, electrical power to the electric machine includes modulating, by the one or more computing devices, an amount of electrical power provided to the electric machine based at least in part on the received data indicative of the operational parameter of the turbomachine.

In certain exemplary aspects, the method further includes receiving, by the one or more computing devices, data indicative of an operational parameter of the turbomachine; and terminating, by the one or more computing devices, the provision of electrical power to the electric machine based at least in part on the received data indicative of the operational parameter of the turbomachine.

In certain exemplary aspects the hybrid electric propulsion system further includes an electric energy storage unit, and the method further includes receiving, by the one or more computing devices, data indicative of a state of charge of the electric energy storage unit, and wherein providing, by the one or more computing devices, electrical power to the electric machine includes modulating, by the one or more computing devices, an amount of electrical power provided to the electric machine based at least in part on the received data indicative of the state of charge of the electric energy storage unit.

In certain exemplary aspects the hybrid electric propulsion system further includes an electric energy storage unit, and the method further includes receiving, by the one or more computing devices, data indicative of a state of charge of the electric energy storage unit; and terminating, by the one or more computing devices, the provision of electrical power to the electric machine based at least in part on the received data indicative of the state of charge of the electric energy storage unit.

In an exemplary embodiment of the present disclosure, a hybrid-electric propulsion system for an aircraft is provided. The hybrid-electric propulsion system includes a propulsor; a turbomachine coupled to the propulsor for driving the propulsor and generating thrust; an electrical system includes an electric machine and an electric energy storage unit electrically connectable to the electric machine, the electric machine coupled to the turbomachine; and a controller. The controller is configured to receive a command to accelerate the turbomachine while operating the turbomachine and provide electrical power to the electric machine to add power to the turbomachine, the propulsor, or both in response to the received command to accelerate the turbomachine.

In certain exemplary embodiments the propulsion system further includes an electric energy storage unit, wherein in providing electrical power to the electric machine the controller is configured to provide electrical power to the electric machine from the electric energy storage unit.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
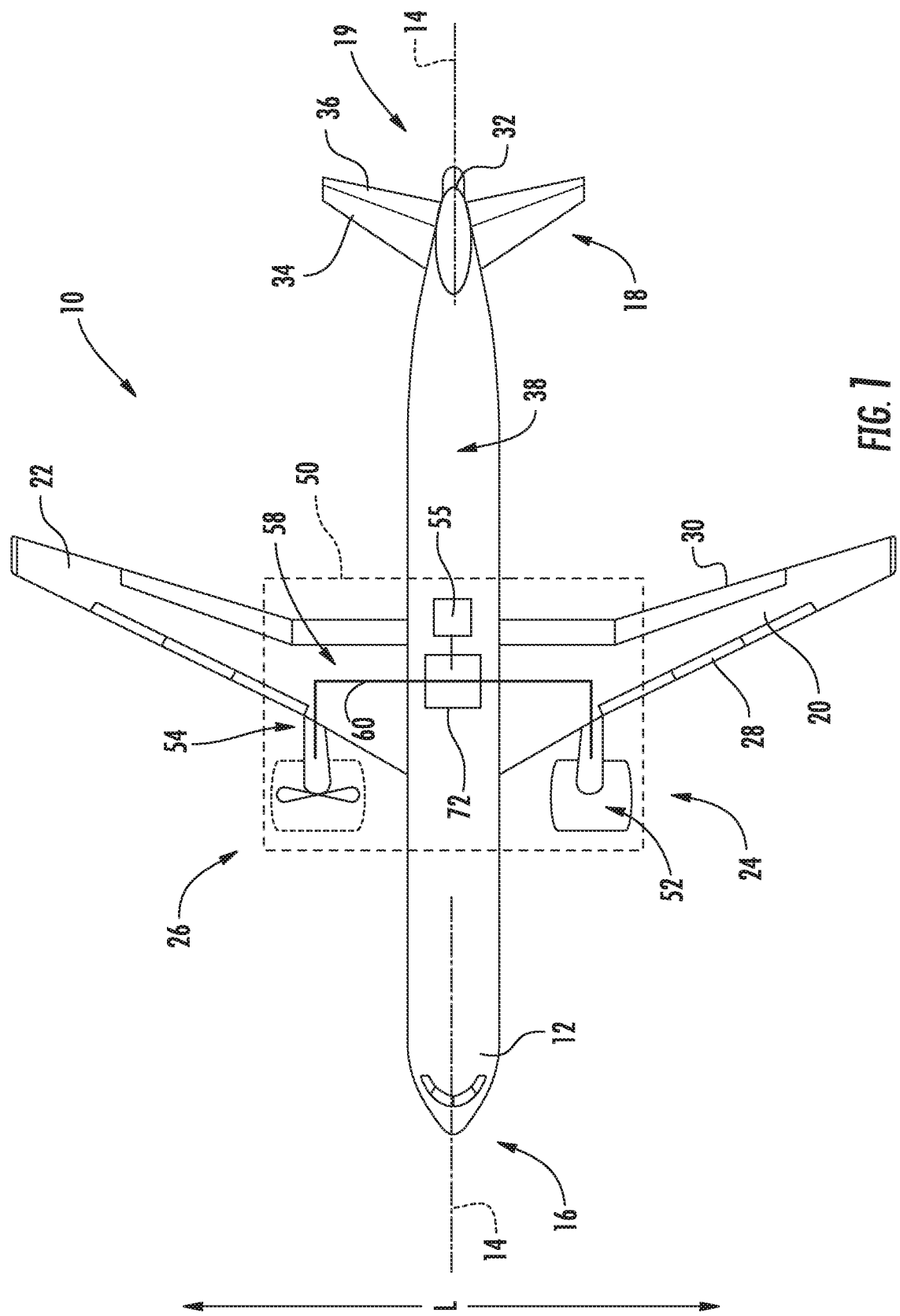
FIG. 1 is a top view of an aircraft according to various exemplary embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to a flow in a pathway. For example, with respect to a fluid flow, "upstream" refers to the direction from which the fluid flows, and "downstream" refers to the direction to which the fluid flows. However, the terms "upstream" and "downstream" as used herein may also refer to a flow of electricity.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a ten percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The present disclosure is generally related to a hybrid electric propulsion system having a turbomachine, a propulsor coupled to the turbomachine, and an electrical system. The electrical system includes an electric machine and (potentially) an electric energy storage unit electrically connectable to the electric machine. Additionally, the electric machine is coupled to the turbomachine such that rotation of the turbomachine rotates the electric machine, and similarly, rotation of the electric machine may rotate one or more components of the turbomachine.

Notably, in certain exemplary embodiments, the propulsor may be a first propulsor, the electric machine may be a first electric machine, the hybrid electric propulsion system may further include a second propulsor, and the electrical system may further include a second electric machine coupled to the second propulsor. In such a manner, the second electric machine may drive the second propulsor during at least certain operations to provide a propulsive benefit for the aircraft. For example, in certain exemplary embodiments, the turbomachine and first propulsor may be together configured as part of a turbofan engine and the second propulsor may be configured as part of an electric propulsor assembly (e.g., an electric fan). Alternatively, in other exemplary embodiments, the turbomachine and first propulsor may be together configured as part of a first turbofan engine and the second propulsor may be configured as part of a second turbofan engine (e.g., with a second turbomachine coupled to the second electric machine and/or the second propulsor). Further, in other exemplary embodiments these components may be configured as part of, e.g., turboprop engines, or any other suitable gas turbine engine.

In certain operations of the hybrid electric propulsion system, the hybrid electric propulsion system is operable to provide for a relatively high level of acceleration for the turbomachine, while also allowing the turbomachine to operate more efficiently. For example, in certain exemplary aspects, the hybrid electric propulsion system may receive a command to accelerate the turbomachine while operating the turbomachine to rotate the propulsor. The hybrid electric propulsion system may provide electrical power to the first electric machine to add power to the turbomachine in response to the received command to accelerate the turbomachine. The additional power added to the turbomachine may increase an acceleration of the turbomachine substantially instantaneously, providing a desirable, relatively quick acceleration response.

It will be appreciated that in at least certain exemplary aspects, the above acceleration assistance may occur during operation of the hybrid electric propulsion system in a steady-state flight operation. Such may be particularly useful when, e.g., the turbomachine includes an active clearance control system. For example, with such an exemplary aspect, the hybrid electric propulsion system may maintain a rotational speed of a core of the turbomachine (i.e., of a high pressure system of the turbomachine) at a substantially constant rotational speed and temperature in response to receiving the command to accelerate the turbomachine, allowing the hybrid electric propulsion system to relax or loosen up the active clearance control system (i.e., increase clearances within the turbomachine, such as radial clearances between various turbine rotor blades and an outer flowpath liner) prior to accelerating the core of the turbomachine. During the time that the active clearance control system is loosening up, the electric power provided to the first electric machine may provide the desired, relatively quick acceleration response of the turbomachine for the aircraft. Notably, as will be discussed in greater detail below, in certain exemplary embodiments, the electric machine may be coupled to a low pressure system of the turbomachine, such that adding power to the turbomachine through the electric machine does not substantially affect a rotational speed of the high pressure system of the turbomachine.

In such a manner, the active clearance control system may be maintained at a relatively tight clearance during the steady-state flight operations, without worrying about acceleration response times, which may, in turn, allow for the turbomachine to be operated more efficiently during such steady-state flight operating conditions.

In other exemplary aspects, it will be appreciated, the above acceleration assistance may occur during operation of the hybrid electric propulsion system in an idle operating condition. The provision of electrical power to the electric machine may occur substantially simultaneously with increasing a fuel flow to a combustion section of the turbomachine. In such a manner, the electric machine may provide relatively immediate power to the turbomachine while the turbomachine speeds up from a low idle setpoint through combustion (allowing the engine to operate at the relatively low idle setpoint with compromising an ability to accelerate).

Referring now to the drawings, wherein identical numerals indicate the same elements throughout the figures, FIG. 1 provides a top view of an exemplary aircraft 10 as may incorporate various embodiments of the present disclosure. As shown in FIG. 1, the aircraft 10 defines a longitudinal centerline 14 that extends therethrough, a lateral direction L, a forward end 16, and an aft end 18. Moreover, the aircraft 10 includes a fuselage 12, extending longitudinally from the forward end 16 of the aircraft 10 to the aft end 18 of the aircraft 10, and an empennage 19 at the aft end of the aircraft 10. Additionally, the aircraft 10 includes a wing assembly including a first, port side wing 20 and a second, starboard side wing 22. The first and second wings 20, 22 each extend laterally outward with respect to the longitudinal centerline 14. The first wing 20 and a portion of the fuselage 12 together define a first side 24 of the aircraft 10, and the second wing 22 and another portion of the fuselage 12 together define a second side 26 of the aircraft 10. For the embodiment depicted, the first side 24 of the aircraft 10 is configured as the port side of the aircraft 10, and the second side 26 of the aircraft 10 is configured as the starboard side of the aircraft 10.

Each of the wings 20, 22 for the exemplary embodiment depicted includes one or more leading edge flaps 28 and one or more trailing edge flaps 30. The aircraft 10 further includes, or rather, the empennage 19 of the aircraft 10 includes, a vertical stabilizer 32 having a rudder flap (not shown) for yaw control, and a pair of horizontal stabilizers 34, each having an elevator flap 36 for pitch control. The fuselage 12 additionally includes an outer surface or skin 38. It should be appreciated however, that in other exemplary embodiments of the present disclosure, the aircraft 10 may additionally or alternatively include any other suitable configuration. For example, in other embodiments, the aircraft 10 may include any other configuration of stabilizer.

Figure 2:
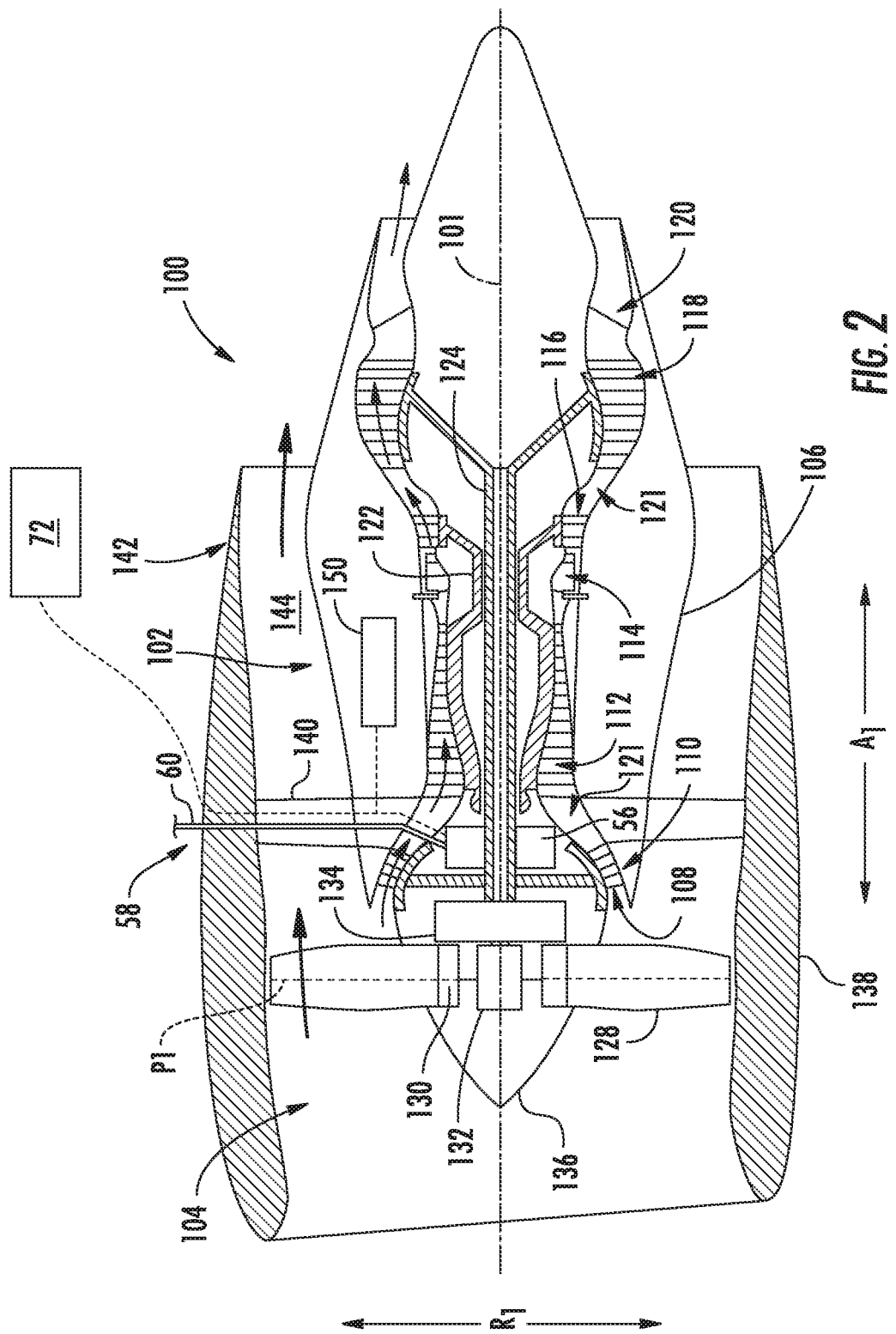
FIG. 2 is a schematic, cross-sectional view of a gas turbine engine mounted to the exemplary aircraft of FIG. 1.
Figure 4:
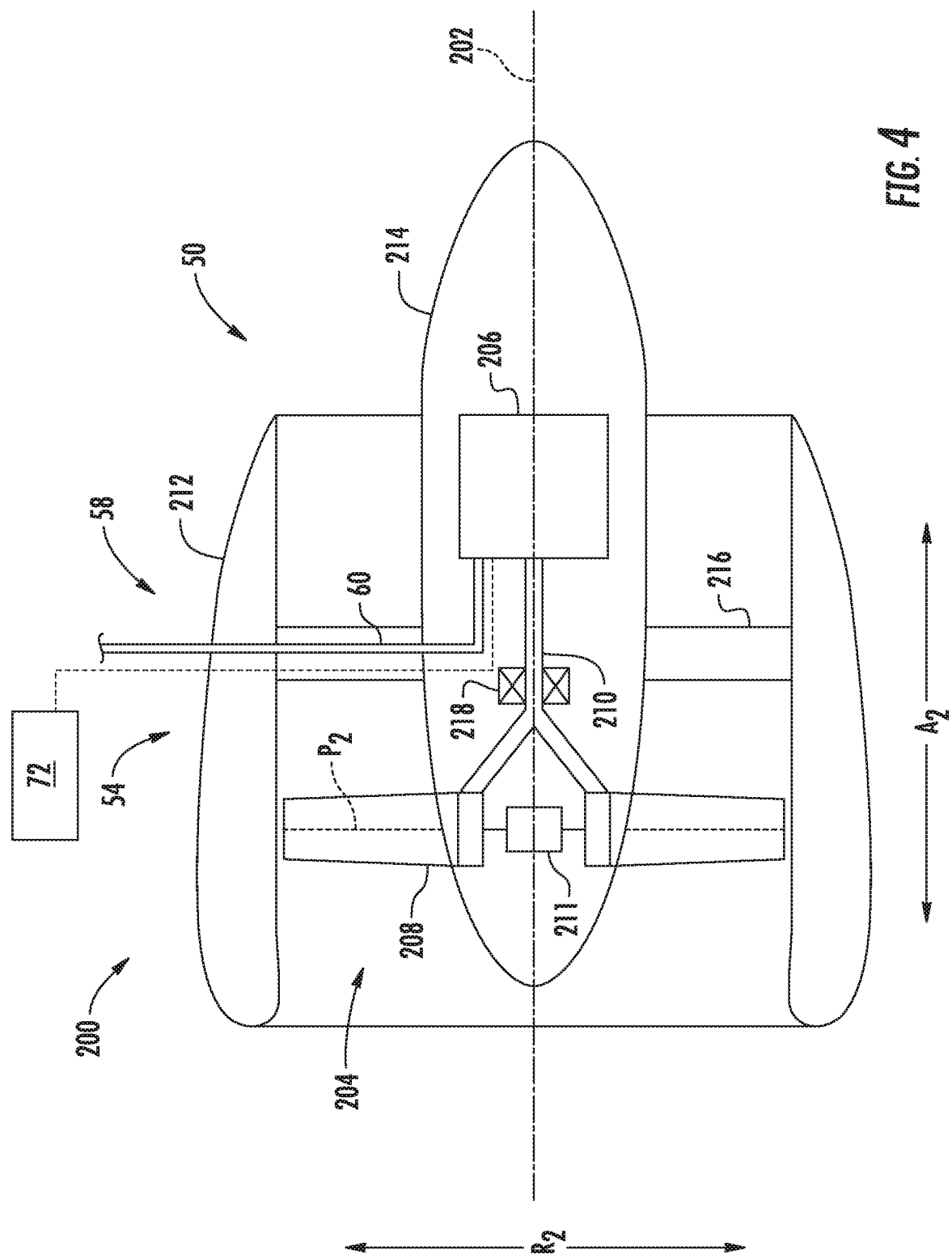
FIG. 4 is a schematic, cross-sectional view of an electric fan assembly in accordance with an exemplary embodiment of the present disclosure.

Referring now also to FIGS. 2 and 4, the exemplary aircraft 10 of FIG. 1 additionally includes a hybrid-electric propulsion system 50 having a first propulsor assembly 52 and a second propulsor assembly 54. FIG. 2 provides a schematic, cross-sectional view of the first propulsor assembly 52, and FIG. 4 provides a schematic, cross-sectional view of the second propulsor assembly 54. For the embodiment depicted, the first propulsor assembly 52 and second propulsor assembly 54 are each configured in an underwing-mounted configuration. However, as will be discussed below, one or both of the first and second propulsor assemblies 52, 54 may in other exemplary embodiments be mounted at any other suitable location.

Figure 3:
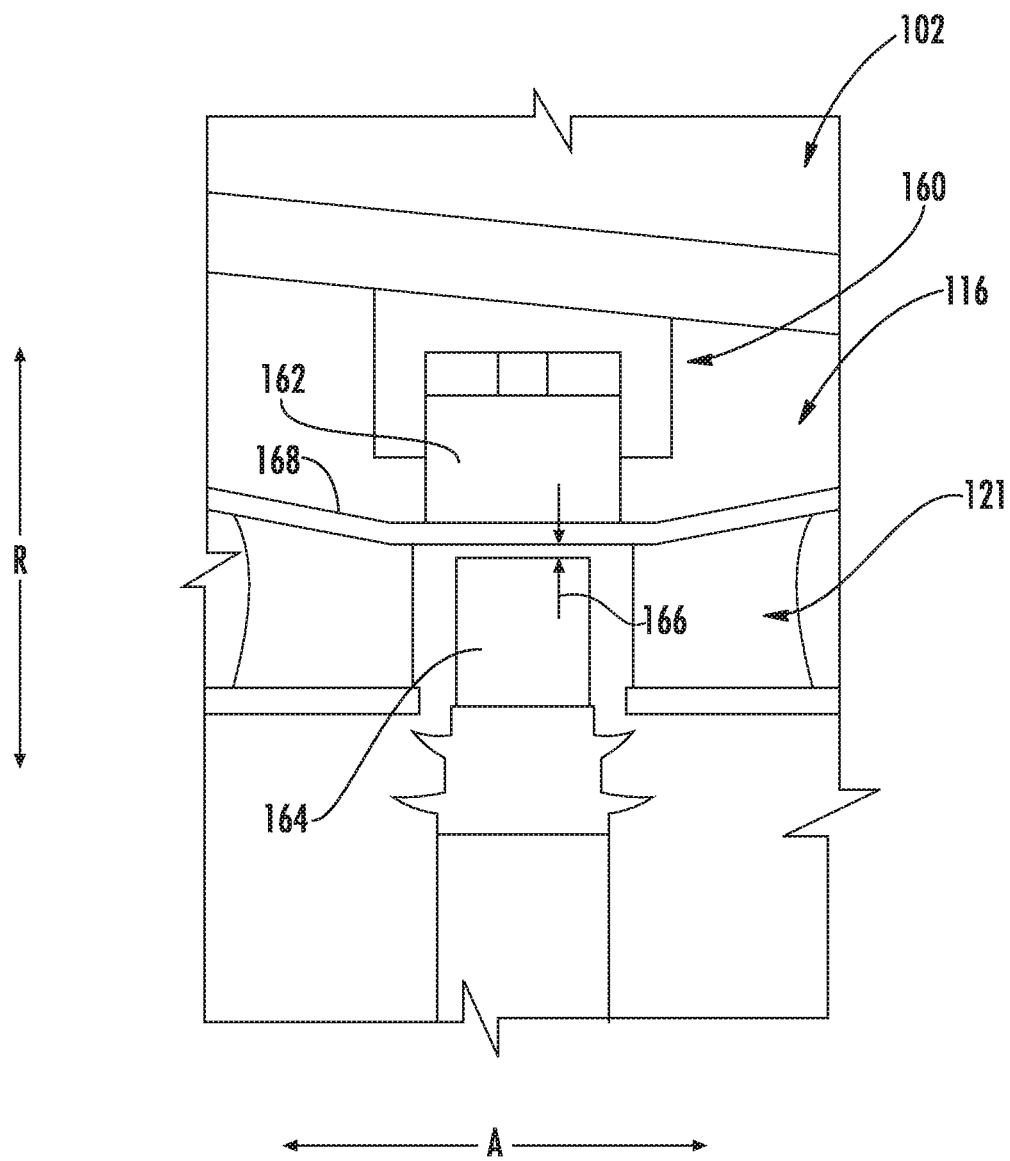
FIG. 3 is a close-up view of an active clearance control system in accordance with one exemplary embodiment of the present disclosure.

More particularly, referring generally to FIGS. 1 through 4, the exemplary hybrid-electric propulsion system 50 generally includes the first propulsor assembly 52 having a turbomachine and a prime propulsor (which, for the embodiment of FIG. 2 are configured together as a gas turbine engine, or rather as a turbofan engine 100), an electric machine 56 (which for the embodiment depicted in FIG. 2 is an electric motor/generator) drivingly coupled to the turbomachine, the second propulsor assembly 54 (which for the embodiment of FIG. 3 is configured as an electric propulsor assembly 200), an electric energy storage unit 55 (electrically connectable to the electric machine 56 and/or the electric propulsor assembly 200, a controller 72, and a power bus 58. The electric propulsor assembly 200, the electric energy storage unit 55, and the electric machine 56 are each electrically connectable to one another through one or more electric lines 60 of the power bus 58. For example, the power bus 58 may include various switches or other power electronics movable to selectively electrically connect the various components of the hybrid electric propulsion system 50. Additionally, the power bus 58 may further include power electronics, such as inverters, converters, rectifiers, etc., for conditioning or converting electrical power within the hybrid electric propulsion system 50.

As will be appreciated, the controller 72 may be configured to distribute electrical power between the various components of the hybrid-electric propulsion system 50. For example, the controller 72 may be operable with the power bus 58 (including the one or more switches or other power electronics) to provide electrical power to, or draw electrical power from, the various components, such as the electric machine 56, to operate the hybrid electric propulsion system 50 between various operating modes and perform various functions. Such is depicted schematically as the electric lines 60 of the power bus 58 extending through the controller 72, and will be discussed in greater detail below.

The controller 72 may be a stand-alone controller, dedicated to the hybrid-electric propulsion system 50, or alternatively, may be incorporated into one or more of a main system controller for the aircraft 10, a separate controller for the exemplary turbofan engine 100 (such as a full authority digital engine control system for the turbofan engine 100, also referred to as a FADEC), etc. For example, the controller 72 may be configured in substantially the same manner as the exemplary computing system 600 described below with reference to FIG. 12 (and may be configured to perform one or more of the functions of the exemplary methods 300, 400, 500, described below).

Additionally, the electric energy storage unit 55 may be configured as one or more batteries, such as one or more lithium-ion batteries, or alternatively may be configured as any other suitable electrical energy storage devices. It will be appreciated that for the hybrid-electric propulsion system 50 described herein, the electric energy storage unit 55 is configured to store a relatively large amount of electrical power. For example, in certain exemplary embodiments, the electric energy storage unit may be configured to store at least about fifty kilowatt hours of electrical power, such as at least about sixty-five kilowatt hours of electrical power, such as at least about seventy-five kilowatts hours of electrical power, and up to about five thousand kilowatt hours of electrical power.

Referring now particularly to FIGS. 1 and 2, the first propulsor assembly 52 includes a gas turbine engine mounted, or configured to be mounted, to the first wing 20 of the aircraft 10. More specifically, for the embodiment of FIG. 2, the gas turbine engine includes a turbomachine 102 and a propulsor, the propulsor being a fan (referred to as "fan 104" with reference to FIG. 2). Accordingly, for the embodiment of FIG. 2, the gas turbine engine is configured as a turbofan engine 100.

The turbofan engine 100 defines an axial direction A1 (extending parallel to a longitudinal centerline 101 provided for reference) and a radial direction R1. As stated, the turbofan engine 100 includes the fan 104 and the turbomachine 102 disposed downstream from the fan 104.

The exemplary turbomachine 102 depicted generally includes a substantially tubular outer casing 106 that defines an annular inlet 108. The outer casing 106 encases, in serial flow relationship, a compressor section including a booster or low pressure (LP) compressor 110 and a high pressure (HP) compressor 112; a combustion section 114; a turbine section including a first, high pressure (HP) turbine 116 and a second, low pressure (LP) turbine 118; and a jet exhaust nozzle section 120. The compressor section, combustion section 114, and turbine section together define at least in part a core air flowpath 121 through the turbomachine 102.

The exemplary turbomachine 102 of the turbofan engine 100 additionally includes one or more shafts rotatable with at least a portion of the turbine section and, for the embodiment depicted, at least a portion of the compressor section. More particularly, for the embodiment depicted, the turbofan engine 100 includes a high pressure (HP) shaft or spool 122, which drivingly connects the HP turbine 116 to the HP compressor 112. Additionally, the exemplary turbofan engine 100 includes a low pressure (LP) shaft or spool 124, which drivingly connects the LP turbine 118 to the LP compressor 110.

Additionally, it will be appreciated that the exemplary turbomachine 102 depicted in FIG. 2 further includes an active clearance control system 160. Specifically, referring now also briefly to FIG. 3, providing a close-up view of the exemplary active clearance control system 160, for the embodiment depicted, the active clearance control system 160 is positioned within the turbine section of the turbomachine 102, and more specifically is operable with the HP turbine 116 of the turbomachine 102. For the embodiment depicted, the active clearance control system 160 generally includes an actuating member 162 movable generally along the radial direction R1.

As will be appreciated, the active clearance control system 160 is generally configured to maintain desired clearances within the turbine section despite, e.g., thermal expansion of one or more components therein. Specifically, as is depicted, the HP turbine 116 generally includes a plurality of HP turbine rotor blades 164. The HP turbine rotor blades 164 define a radially outer tip that defines a clearance 166 with an outer liner 168, the outer liner 168 defining at least in part the core air flowpath 121. By moving the actuating member 162 along the radial direction R1, the active clearance control system 160 may move the liner 168 surrounding the plurality of HP turbine rotor blades 164 radially inward or radially outward to increase or decrease the clearance 166. For example, it may generally be desirable to increase the clearance 166 during an acceleration of the turbomachine 102 to allow the plurality of HP turbine rotor blades 164 to expand along the radial direction R1 due to the increased rotational speed and/or increased temperature to which they are exposed. By contrast, may generally be desirable to decrease the clearance 166 during operation of the turbomachine 102 at steady-state flight operating conditions to increase an efficiency of the turbomachine 102. Although depicted being operable with the HP turbine 116, in other exemplary embodiments, the active clearance control system 160 may further be operable with, e.g., the LP turbine 118. Additionally, in other exemplary embodiments of the present disclosure, the active clearance control system 160 may have any other suitable configuration.

Referring back specifically to FIG. 2, the exemplary fan 104 depicted is configured as a variable pitch fan having a plurality of fan blades 128 coupled to a disk 130 in a spaced apart manner. The fan blades 128 extend outwardly from disk 130 generally along the radial direction R1. Each fan blade 128 is rotatable relative to the disk 130 about a respective pitch axis P1 by virtue of the fan blades 128 being operatively coupled to a suitable actuation member 132 configured to collectively vary the pitch of the fan blades 128. The fan 104 is mechanically coupled to the LP shaft 124, such that the fan 104 is mechanically driven by the second, LP turbine 118. More particularly, the fan 104, including the fan blades 128, disk 130, and actuation member 132, is mechanically coupled to the LP shaft 124 through a power gearbox 134, and is rotatable about the longitudinal axis 101 by the LP shaft 124 across the power gear box 134. The power gear box 134 includes a plurality of gears for stepping down the rotational speed of the LP shaft 124 to a more efficient rotational fan speed. Accordingly, the fan 104 is powered by an LP system (including the LP turbine 118) of the turbomachine 102.

Referring still to the exemplary embodiment of FIG. 2, the disk 130 is covered by rotatable front hub 136 aerodynamically contoured to promote an airflow through the plurality of fan blades 128. Additionally, the turbofan engine 100 includes an annular fan casing or outer nacelle 138 that circumferentially surrounds the fan 104 and/or at least a portion of the turbomachine 102. Accordingly, the exemplary turbofan engine 100 depicted may be referred to as a "ducted" turbofan engine. Moreover, the nacelle 138 is supported relative to the turbomachine 102 by a plurality of circumferentially-spaced outlet guide vanes 140. A downstream section 142 of the nacelle 138 extends over an outer portion of the turbomachine 102 so as to define a bypass airflow passage 144 therebetween.

Referring still to FIG. 2, the hybrid-electric propulsion system 50 additionally includes an electric machine 56, which for the embodiment depicted is configured as an electric motor/generator. The electric machine 56 is, for the embodiment depicted, positioned within the turbomachine 102 of the turbofan engine 100, inward of the core air flowpath 121, and is coupled to/in mechanical communication with one of the shafts of the turbofan engine 100. More specifically, for the embodiment depicted, the electric machine is coupled to the second, LP turbine 118 through the LP shaft 124. The electric machine 56 may be configured to convert mechanical power of the LP shaft 124 to electrical power (such that the LP shaft 124 drives the electric machine 56), or alternatively the electric machine 56 may be configured to convert electrical power provided thereto into mechanical power for the LP shaft 124 (such that the electric machine 56 drives, or assists with driving, the LP shaft 124).

It should be appreciated, however, that in other exemplary embodiments, the electric machine 56 may instead be positioned at any other suitable location within the turbomachine 102 or elsewhere. For example, the electric machine 56 may be, in other embodiments, mounted coaxially with the LP shaft 124 within the turbine section, or alternatively may be offset from the LP shaft 124 and driven through a suitable gear train. Additionally, or alternatively, in other exemplary embodiments, the electric machine 56 may instead be powered by the HP system, i.e., by the HP turbine 116 through, e.g., the HP shaft 122, or by both the LP system (e.g., the LP shaft 124) and the HP system (e.g., the HP shaft 122) via a dual drive system. Additionally, or alternatively, still, in other embodiments, the electric machine 56 may include a plurality of electric machines, e.g., with one being drivingly connected to the LP system (e.g., the LP shaft 124) and one being drivingly connected to the HP system (e.g., the HP shaft 122). Further, although the electric machine 56 is described as an electric motor/generator, in other exemplary embodiments, the electric machine 56 may be configured solely as an electric generator.

Notably, in certain exemplary embodiments, the electric machine 56 may be configured to generate at least about ten kilowatts of electrical power when driven by the turbomachine 102, such as at least about fifty kilowatts of electrical power, such as at least about sixty-five kilowatts of electrical power, such as at least about seventy-five kilowatts of electrical power, such as at least about one hundred kilowatts of electrical power, such as up to five thousand kilowatts of electrical power. Additionally, or alternatively, the electric machine 56 may be configured to provide, or otherwise add, at least about fifteen horsepower of mechanical power to the turbomachine 102 when the electric machine 56 is provided electrical power from, e.g., the electric energy storage unit 55. For example, in certain exemplary embodiments, the electric machine 56 may be configured to provide at least about fifty horsepower mechanical power to the turbomachine 102, such as at least about seventy-five horsepower, such as at least about one hundred horsepower, such as at least about one hundred and twenty horsepower, such as up to about seven thousand horsepower.

Referring still to FIGS. 1 and 2, the turbofan engine 100 further includes a controller 150 and a plurality of sensors (not shown). The controller 150 may be a full authority digital engine control system, also referred to as a FADEC. The controller 150 of the turbofan engine 100 may be configured to control operation of, e.g., the actuation member 132, the fuel delivery system, etc. Additionally, referring back also to FIG. 1, the controller 150 of the turbofan engine 100 is operably connected to the controller 72 of the hybrid-electric propulsion system 50. Moreover, as will be appreciated, the controller 72 may further be operably connected to one or more of the first propulsor assembly 52 (including controller 150), the electric machine 56, the second propulsor assembly 54, and the energy storage unit 55 through a suitable wired or wireless communication system (depicted in phantom).

Moreover, although not depicted, in certain exemplary embodiments, the turbofan engine 100 may further include one or more sensors positioned to, and configured to, sense data indicative of one or more operational parameters of the turbofan engine 100. For example, the turbofan engine 100 may include one or more temperature sensors configured to sense a temperature within a core air flowpath 121 of the turbomachine 102. Additionally, or alternatively, the turbofan engine 100 may include one or more sensors configured to sense an exhaust gas temperature at an exit of the combustion section 114. Additionally, or alternatively, still, the turbofan engine 100 may include one or more pressure sensors configured to sense data indicative of a pressure within the core air flowpath 121 of the turbomachine 102, such as within a combustor within the combustion section 114 of the turbomachine 102. Further, in still other exemplary embodiments, the turbofan engine 100 one or more speed sensors configured to sense data indicative of a rotational speed of one or more components of the turbofan engine 100, such as one or more of the LP spool 124 or HP spool 122.

It should further be appreciated that the exemplary turbofan engine 100 depicted in FIG. 2 may, in other exemplary embodiments, have any other suitable configuration. For example, in other exemplary embodiments, the fan 104 may not be a variable pitch fan, and further, in other exemplary embodiments, the LP shaft 124 may be directly mechanically coupled to the fan 104 (i.e., the turbofan engine 100 may not include the gearbox 134). Further, it should be appreciated that in other exemplary embodiments, the turbofan engine 100 may be configured as any other suitable gas turbine engine. For example, in other embodiments, the turbofan engine 100 may instead be configured as a turboprop engine, an unducted turbofan engine, a turbojet engine, a turboshaft engine, etc.

Referring now particularly to FIGS. 1 and 4, as previously stated the exemplary hybrid-electric propulsion system 50 additionally includes the second propulsor assembly 54 mounted, for the embodiment depicted, to the second wing 22 of the aircraft 10. Referring particularly to FIG. 4, the second propulsor assembly 54 is generally configured as an electric propulsor assembly 200 including an electric motor 206 and a propulsor/fan 204. The electric propulsor assembly 200 defines an axial direction A2 extending along a longitudinal centerline axis 202 that extends therethrough for reference, as well as a radial direction R2. For the embodiment depicted, the fan 204 is rotatable about the centerline axis 202 by the electric motor 206.

The fan 204 includes a plurality of fan blades 208 and a fan shaft 210. The plurality of fan blades 208 are attached to/rotatable with the fan shaft 210 and spaced generally along a circumferential direction of the electric propulsor assembly 200 (not shown). In certain exemplary embodiments, the plurality of fan blades 208 may be attached in a fixed manner to the fan shaft 210, or alternatively, the plurality of fan blades 208 may be rotatable relative to the fan shaft 210, such as in the embodiment depicted. For example, the plurality of fan blades 208 each define a respective pitch axis P2, and for the embodiment depicted are attached to the fan shaft 210 such that a pitch of each of the plurality of fan blades 208 may be changed, e.g., in unison, by a pitch change mechanism 211. Changing the pitch of the plurality of fan blades 208 may increase an efficiency of the second propulsor assembly 54 and/or may allow the second propulsor assembly 54 to achieve a desired thrust profile. With such an exemplary embodiment, the fan 204 may be referred to as a variable pitch fan.

Moreover, for the embodiment depicted, the electric propulsor assembly 200 depicted additionally includes a fan casing or outer nacelle 212, attached to a core 214 of the electric propulsor assembly 200 through one or more struts or outlet guide vanes 216. For the embodiment depicted, the outer nacelle 212 substantially completely surrounds the fan 204, and particularly the plurality of fan blades 208. Accordingly, for the embodiment depicted, the electric propulsor assembly 200 may be referred to as a ducted electric fan.

Referring still particularly to FIG. 4, the fan shaft 210 is mechanically coupled to the electric motor 206 within the core 214, such that the electric motor 206 drives the fan 204 through the fan shaft 210. The fan shaft 210 is supported by one or more bearings 218, such as one or more roller bearings, ball bearings, or any other suitable bearings. Additionally, the electric motor 206 may be an inrunner electric motor (i.e., including a rotor positioned radially inward of a stator), or alternatively may be an outrunner electric motor (i.e., including a stator positioned radially inward of a rotor), or alternatively, still, may be an axial flux electric motor (i.e., with the rotor neither outside the stator nor inside the stator, but rather offset from it along the axis of the electric motor).

As briefly noted above, the electrical power source (e.g., the electric machine 56 or the electric energy storage unit 55) is electrically connected with the electric propulsor assembly 200 (i.e., the electric motor 206) for providing electrical power to the electric propulsor assembly 200. More particularly, the electric motor 206 is in electrical communication with the electric machine 56 and/or the electric energy storage unit 55 through the electrical power bus 58, and more particularly through the one or more electrical cables or lines 60 extending therebetween.

It should be appreciated, however, that in other exemplary embodiments the exemplary hybrid-electric propulsion system 50 may have any other suitable configuration, and further, may be integrated into an aircraft 10 in any other suitable manner. For example, in other exemplary embodiments, the electric propulsor assembly 200 of the hybrid electric propulsion system 50 may instead be configured as a plurality of electric propulsor assemblies 200 and/or the hybrid electric propulsion system 50 may further include a plurality of gas turbine engines (such as turbofan engine 100) and electric machines 56.

Further, in other exemplary embodiments, the electric propulsor assembly(ies) 200 and/or gas turbine engine(s) and electric machine(s) 56 may be mounted to the aircraft 10 at any other suitable location in any other suitable manner (including, e.g., tail mounted configurations). For example, in certain exemplary embodiments, the electric propulsor assembly may be configured to ingest boundary layer air and reenergize such boundary layer air to provide a propulsive benefit for the aircraft (the propulsive benefit may be thrust, or may simply be an increase in overall net thrust for the aircraft by reducing a drag on the aircraft).

Moreover, in still other exemplary embodiments, the exemplary hybrid electric propulsion system 50 may have still other configurations. For example, in other exemplary embodiments, the hybrid electric propulsion system 50 may not include a "pure" electric propulsor assembly. For example, referring now briefly to FIG. 5, a schematic diagram of a hybrid-electric propulsion system 50 in accordance with yet another exemplary embodiment of the present disclosure is provided. The exemplary hybrid electric propulsion system 50 depicted in FIG. 5 may be configured in a similar manner as one or more the exemplary hybrid electric propulsion systems 50 described above with reference to FIGS. 1 through 4.

Figure 5:
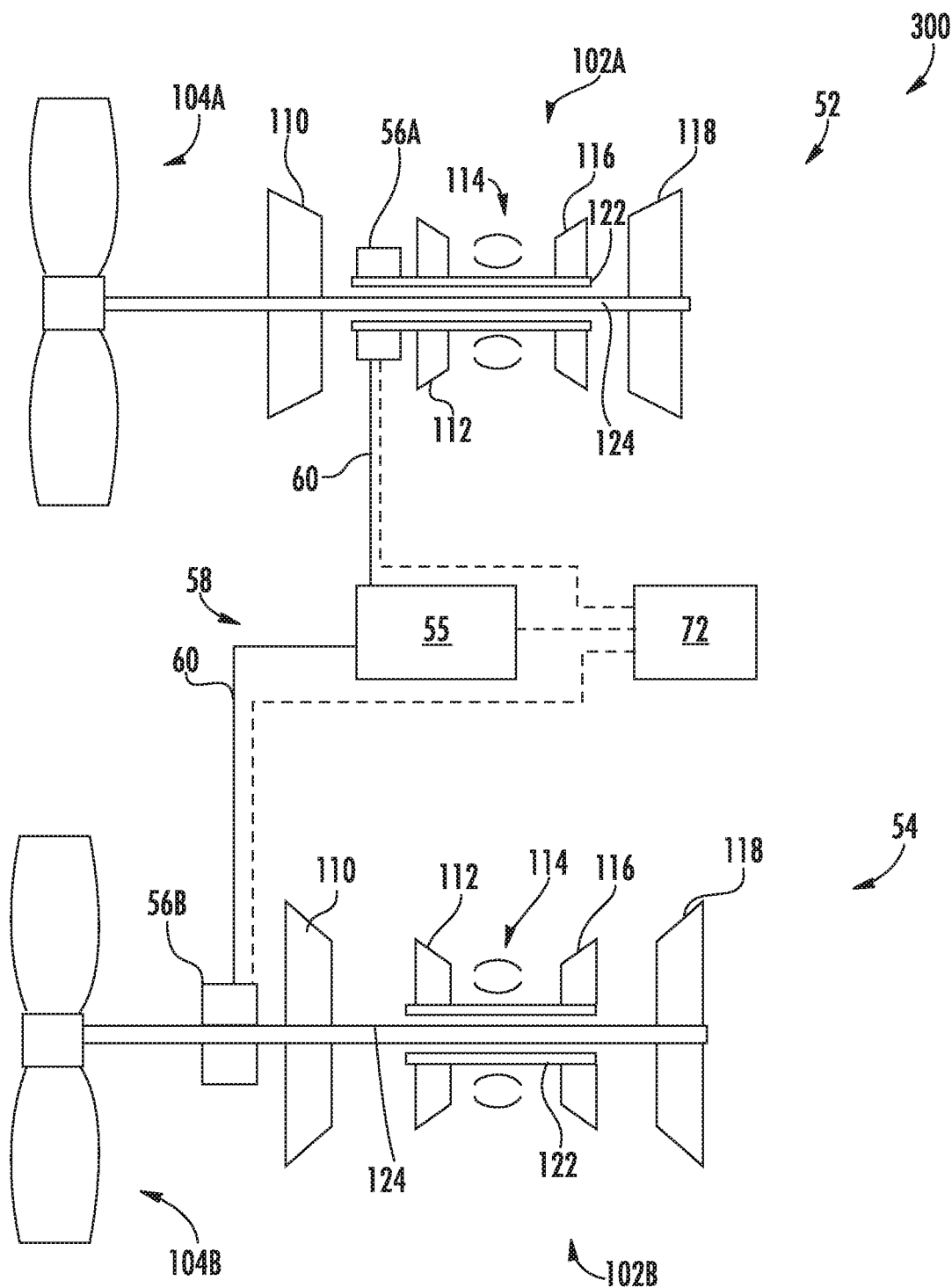
FIG. 5 is a top view of an aircraft including a propulsion system in accordance with another exemplary embodiment of the present disclosure.

For example, the exemplary hybrid-electric propulsion system 50 of FIG. 5 generally includes a first propulsor assembly 52 and a second propulsor assembly 54. The first propulsor assembly generally includes a first turbomachine 102A and a first propulsor 104A, and similarly, the second propulsor assembly 54 generally includes a second turbomachine 102B and a second propulsor 104B. Each of the first and second turbomachines 102A, 102B generally includes a low pressure system having a low pressure compressor 110 drivingly coupled to a low pressure turbine 118 through a low pressure shaft 124, as well as a high pressure system having a high pressure compressor 112 drivingly coupled to a high pressure turbine 116 through a high pressure shaft 122 (sometimes also referred to as a "core" of the turbomachine). Additionally, the first propulsor 104A is drivingly coupled to the low pressure system of the first turbomachine 102A and the second propulsor 104B is drivingly coupled to the low pressure system of the second turbomachine 102B. In certain exemplary embodiments, the first propulsor 104A and first turbomachine 102A may be configured as a first turbofan engine and similarly, the second propulsor 104B and second turbomachine 102B may be configured as a second turbofan engine (e.g., similar to the exemplary turbofan engine 100 of FIG. 2). Alternatively, however, these components may instead be configured as parts of a turboprop engine or any other suitable turbomachine-driven propulsion device. Further, in certain exemplary embodiments, the first propulsor assembly 52 may be mounted to a first wing of an aircraft and the second propulsor assembly 54 may be mounted to a second wing of the aircraft (similar, e.g., to the exemplary embodiment of FIG. 1). Of course, in other exemplary embodiments, any other suitable configuration may be provided (e.g., both may be mounted to the same wing, one or both may be mounted to a tail of the aircraft, etc.).

Moreover, the hybrid electric propulsion system 50 of FIG. 5 additionally includes an electrical system. The electrical system includes a first electric machine 56A, a second electric machine 56B, and an electric energy storage unit 55 electrically connectable to the first electric machine 56A and the second electric machine 56B. The first electric machine 56A is additionally coupled to the first turbomachine 102A. More specifically, for the embodiment depicted, the first electric machine 56A is coupled to the high pressure system of the first turbomachine 102A, and more specifically still, is coupled to the high-pressure spool 122 of the first turbomachine 102A. In such a manner, the first electric machine 56A may extract power from the high pressure system of the first turbomachine 102A and/or provide power to the high-pressure system of the first turbomachine 102A.

Further, it will be appreciated that for the embodiment depicted, the second propulsor assembly 54 is not configured as a pure electric propulsor assembly. Instead, the second propulsor assembly 54 is configured as part of a hybrid electric propulsor. More particularly, the second electric machine 56B is coupled to the second propulsor 104B, and is further coupled to the low pressure system of the second turbomachine 102B. In such a manner, the second electric machine 56B may extract power from the low pressure system of the second turbomachine 102B and/or provide power to the low pressure system of the first turbomachine 102A. More particularly, in certain exemplary aspects, the second electric machine 56B may drive, or assist with driving the second propulsor 104B, such that the second electric machine 56B may provide power to the second turbomachine 102B, the second propulsor 104B, or both.

As is also depicted in FIG. 5, the exemplary hybrid electric propulsion system 50 further includes a controller 72 and a power bus 58. The first electric machine 56A, the second electric machine 56B, and the electric energy storage unit 55 are each electrically connectable to one another through one or more electric lines 60 of the power bus 58. For example, the power bus 58 may include various switches or other power electronics movable to selectively electrically connect the various components of the hybrid electric propulsion system 50, and optionally to convert or condition such electrical power transferred therethrough.

Furthermore, it should be appreciated that in still other exemplary embodiments, the exemplary hybrid electric propulsion system 50 may have other suitable configurations. For example, although the exemplary embodiment of FIG. 5 includes a first electric machine 56A coupled to the high-pressure system of the first turbomachine 102A and the second electric machine 56B coupled to the low pressure system of the second turbomachine 102B, in other exemplary embodiments, each of the electric machines 56A, 56B may be coupled to the low pressure system, or alternatively may be coupled to the high-pressure system. Alternatively, in other exemplary embodiments the electrical system may further include an additional electric machine coupled to the low pressure system of the first turbomachine 102A and/or an additional electric machine coupled to the high-pressure system of the second turbomachine 102B.

Figure 6:
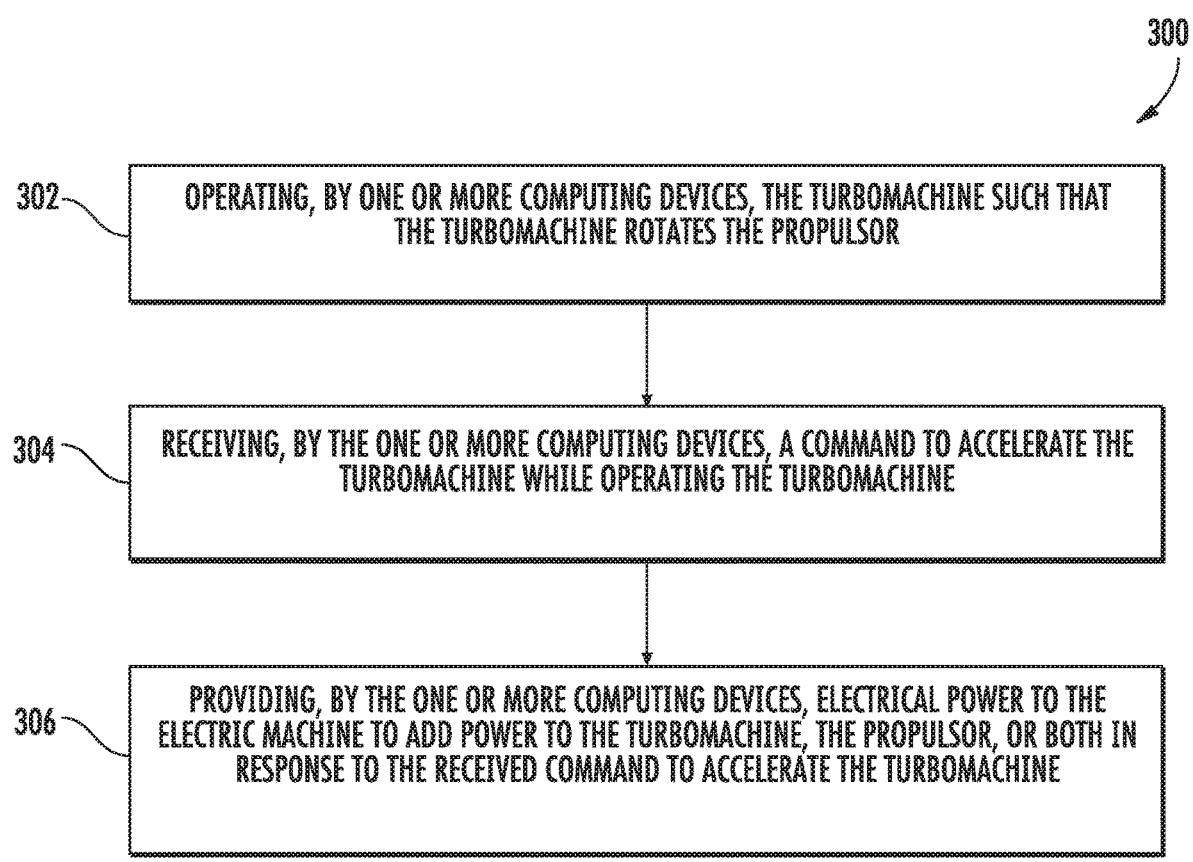
FIG. 6 is a flow diagram of a method for operating a hybrid electric propulsion system of an aircraft in accordance with an exemplary aspect of the present disclosure.

Referring now to FIG. 6, a flow diagram of a method 300 for operating a hybrid electric propulsion system of an aircraft is provided. The method 300 may generally be operable with one or more of the exemplary hybrid electric propulsion systems described above with reference to FIGS. 1 through 5. For example, the hybrid electric propulsion system may generally include a turbomachine, a propulsor coupled to the turbomachine, and an electrical system, with the electrical system including an electric machine coupled to the turbomachine and an electric energy storage unit. The electric energy storage unit may be electrically connectable to the electric machine.

As is depicted, the method 300 includes at (302) operating, by one or more computing devices, the turbomachine such that the turbomachine rotates the propulsor. As will be explained in greater detail below, the method 300 may rotate the propulsor at (302) to generate thrust during a flight operating condition (e.g., steady-state flight operating condition; see FIGS. 7 through 9), or the method 300 may rotate the propulsor at (302) during an idle operating condition to generate a minimum amount of thrust (see FIGS. 10 and 11).

The method 300 further includes at (304) receiving, by the one or more computing devices, a command to accelerate the turbomachine while operating the turbomachine at (302), and at (306) providing, by the one or more computing devices, electrical power to the electric machine to add power to the turbomachine, the propulsor, or both in response to the received command to accelerate the turbomachine at (304).

The above-described method 300 may be applied to numerous scenarios (see, e.g., discussion below with reference to FIGS. 6 through 11). Regardless, however, it may provide for a more responsive propulsion system and/or may allow the turbomachine to operate more efficiently.

Figure 7:
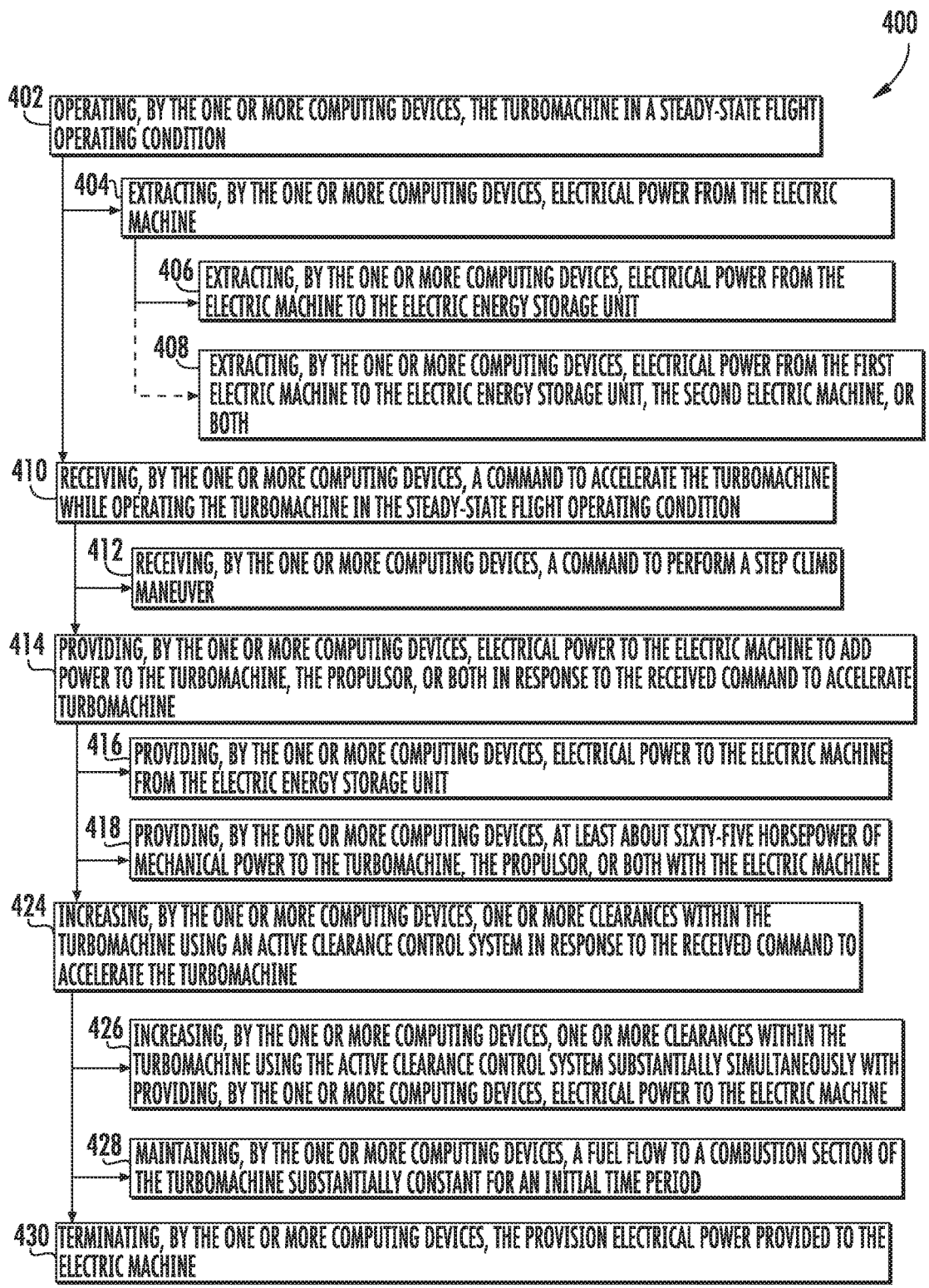
FIG. 7 is a flow diagram of a method for operating a hybrid electric propulsion system of an aircraft in accordance with another exemplary aspect of the present disclosure.
Figure 8:
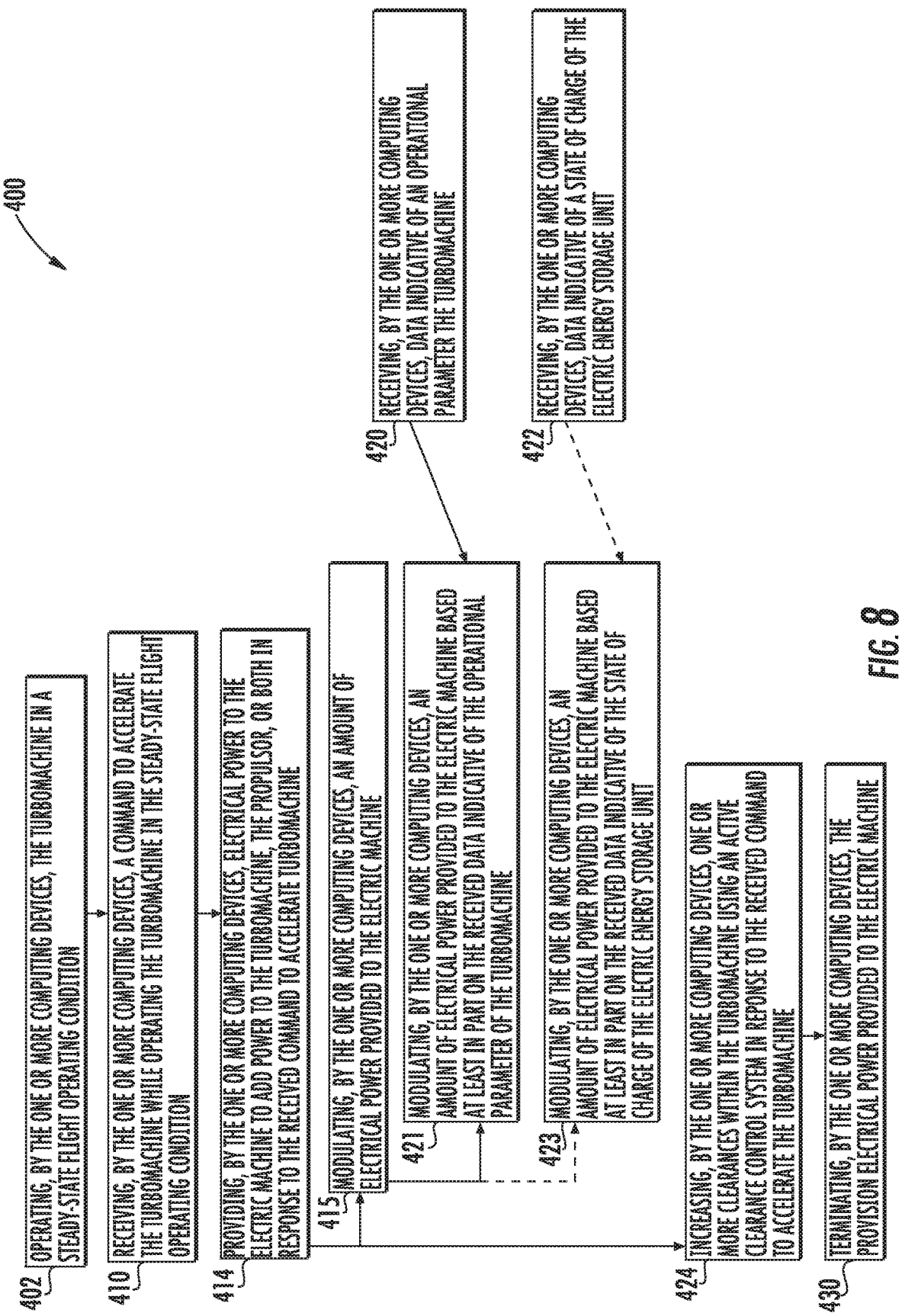
FIG. 8 is a flow diagram of an exemplary aspect of the exemplary method for operating a hybrid electric propulsion system of an aircraft of FIG. 7.

For example, referring now to FIG. 7, a flow diagram of a method 400 for operating a hybrid electric propulsion system of an aircraft is provided. The method 400 is similar to the exemplary method 300 described above with reference to FIG. 6, and accordingly may generally be operable with one or more of the exemplary hybrid electric propulsion systems described above with reference to FIGS. 1 through 5. For example, the hybrid electric propulsion system may generally include a turbomachine, a propulsor coupled to the turbomachine, and an electrical system, with the electrical system including an electric machine coupled to the turbomachine and an electric energy storage unit (optionally). The electric energy storage unit may be electrically connectable to the electric machine.

As is depicted, the method 400 includes operating, by one or more computing devices, the turbomachine such that the turbomachine rotates the propulsor, and more specifically includes at (402) operating, by the one or more computing devices, the turbomachine in a steady-state flight operating condition. For example, in at least certain exemplary aspects, operating, by the one or more computing devices, the turbomachine in the steady-state flight operating condition at (402) includes operating, by the one or more computing devices, the turbomachine in a cruise operating condition.

Notably, during such steady-state flight operating conditions, the hybrid electric propulsion system may generally be operable to distribute electrical power amongst its components. For example, for the exemplary aspect of the method 400 depicted in FIG. 7, operating, by the one or more computing devices, the turbomachine in the steady-state flight operating condition at (402) further includes at (404) extracting, by the one or more computing devices, electrical power from the electric machine. More specifically, for the exemplary aspect depicted, extracting, by the one or more computing devices, electrical power from the electric machine at (404) includes at (406) extracting, by the one or more computing devices, electrical power from the electric machine to the electric energy storage unit.

Further, as will be appreciated from the discussion above, in at least certain exemplary aspects the hybrid electric propulsion system may further include a plurality of electric machines and/or propulsors. For example, in certain exemplary aspects, the electric machine may be a first electric machine, the propulsor may be a first propulsor, the hybrid electric propulsion system may further include a second propulsor, and the electrical system may further include a second electric machine coupled to the second propulsor. With such an exemplary aspect, extracting, by the one or more computing devices, electrical power from the electric machine at (404) may further include, as is depicted in phantom, at (408) extracting, by the one or more computing devices, electrical power from the first electric machine to the electric energy storage unit, the second electric machine, or both. For example, in certain exemplary aspects, extracting, by the one or more computing devices, electrical power from the electric machine at (408) may further include, extracting, by the one or more computing devices, electrical power from the first electric machine to the second electric machine.

Referring still to the exemplary aspect of the method 400 depicted, the method 400 further includes receiving, by the one or more computing devices, a command to accelerate the turbomachine, and more specifically includes at (410) receiving, by the one or more computing devices, a command to accelerate the turbomachine while operating the turbomachine in the steady-state flight operating condition at (402). For example, in at least certain exemplary aspects, such as the exemplary aspect depicted, receiving, by the one or more computing devices, the command to accelerate the turbomachine while operating the turbomachine in the steady-state operating condition at (410) may include at (412) receiving, by the one or more computing devices, a command to perform a step climb maneuver. As will be appreciated, the step climb maneuver refers generally to a maneuver during flight operations to take an aircraft cruising a first altitude to a second, higher altitude. An increased amount of thrust is generally required to perform such maneuver, as compared to the amount of thrust required during the immediately preceding cruise operations.

Further, the exemplary aspect of the method 400 depicted further includes providing, by the one or more computing devices, electrical power to the electric machine to add power to the turbomachine, the propulsor, or both in response to the received command to accelerate the turbomachine, and more specifically includes at (414) providing, by the one or more computing devices, electrical power to the electric machine to add power to the turbomachine, the propulsor, or both in response to the received command to accelerate turbomachine at (410). Notably, the provision of electrical power to the electric machine at (414) may, by adding such power to the turbomachine, the propulsor, or both, increase an acceleration of the turbomachine (or provide an increased thrust generated by the propulsor), providing a substantially instantaneous effective power increase for the electric machine in response to the command to accelerate the turbomachine received at (410).

For the exemplary aspect depicted, providing, by the one or more computing devices, electrical power to the electric machine at (414) includes at (416) providing, by the one or more computing devices, electrical power to the electric machine from the electric energy storage unit. More specifically, for the exemplary aspect depicted, providing, by the one or more computing devices, electrical power to the electric machine from the electric energy storage unit at (414) includes at (418) providing, by the one or more computing devices, at least about fifteen horsepower of mechanical power to the turbomachine, the propulsor, or both with the electric machine (note that as used herein, the amount of power provided, if provided to "both" the turbomachine and the propulsor is a sum of all power provided by the electric machine to the turbomachine and propulsor). In such a manner, the method 400 may generally provide a desired acceleration increase in response to the command to accelerate the turbomachine while operating the turbomachine in the steady-state flight operating condition is received at (410).

Notably, in at least certain exemplary aspects, providing, the one or more computing devices, electrical power to the electric machine to add power to the turbomachine, the propulsor, or both in response to the received command to accelerate the turbomachine at (414) may include providing a substantially constant/consistent amount of electrical power to the electric machine. However, referring now briefly to FIG. 8, providing a flow diagram of an exemplary aspect of the method 400 of FIG. 7, in other exemplary aspects, such as the exemplary aspect depicted, providing, by the one or more computing devices, electrical power to the electric machine at (414) includes at (415) modulating, by the one or more computing devices, an amount of electrical power provided to the electric machine. More specifically, the exemplary aspect of the method 400 depicted in FIG. 8 further includes at (420) receiving, by the one or more computing devices, data indicative of an operational parameter the turbomachine, and modulating, by the one or more computing devices, the amount of electrical power provided to the electric machine at (415) further includes at (421) modulating, by the one or more computing devices, an amount of electrical power provided to the electric machine based at least in part on the received data indicative of the operational parameter of the turbomachine. For example, in such a manner, the method 400 may reduce an amount of electrical power provided to the electric machine, as the electric machine approaches a desired rotational speed, or a desired power output.

In certain exemplary aspects, the operational parameter the turbomachine may be a rotational speed parameter of one or more components of the turbomachine, such as a rotational speed, a rotational acceleration, or a combination thereof. Alternatively, the operational parameter of the turbomachine may be any other suitable operational parameter, such as a temperature within the turbomachine (such as an exhaust gas temperature), a pressure within the turbomachine, a fuel flow to a combustion section of the turbomachine, etc.

However, in other exemplary aspects, the method 400 may modulate an amount of electrical power provided to the electric machine at (415) based on any other suitable parameters. For example, in other exemplary aspects, as is depicted in phantom in FIG. 8, the method 400 may further include at (422) receiving, by the one or more computing devices, data indicative of a state of charge of the electric energy storage unit. Whit such an exemplary aspect, modulating, by the one or more computing devices, the amount of electrical power provided to the electric machine at (415) may further include, as is depicted in phantom, at (423) modulating, by the one or more computing devices, an amount of electrical power provided to the electric machine based at least in part on the received data indicative of the state of charge of the electric energy storage unit. For example, the method 400 may reduce an amount of electrical power provided to the electric machine when, for example, the charge level of the electric energy storage unit falls below a certain threshold, or approaches a certain threshold.

Referring back to FIG. 7, as stated, the method 400 may generally be operable to provide a substantially immediate acceleration response once the command to accelerate the turbomachine while operating the turbomachine in the steady-state flight operating condition is received at (410). Accordingly, such may allow for the turbomachine to operate more efficiently at the steady-state flight operating condition. More particularly, for the exemplary aspect of FIG. 7, the turbomachine further includes an active clearance control system. The active clearance control system may modify clearances between one or more turbine rotor blades and an outer flowpath liner within a turbine section of the turbomachine during operation of the turbomachine. Typically, when operating at a steady-state flight operation condition, the clearances are maintained larger than would otherwise be desirable from an efficiency standpoint in order to allow for a relatively quick acceleration of the turbomachine if desired. For example, as will be appreciated, an acceleration of the turbomachine from a steady-state operating condition increases a rotational speed of the turbine rotor blades, and also increases a temperature to which the turbine rotor blades and other components are exposed, resulting in an expansion of the turbine rotor blades and certain other components. The relatively large clearances are maintained to accommodate such expansion. However, given that the hybrid electric propulsion system of the present disclosure, and more specifically, the electric machine coupled to the turbomachine, may provide the substantially immediate acceleration response desired, the active clearance control system may be operated to maintain relatively tight clearances between the turbine rotor blades and, e.g., an outer flowpath liner within the turbine section. For example, for the exemplary aspect of the method 400 depicted, the active clearance control system may maintain desired relatively tight clearances, and in response to receiving a command to accelerate the turbomachine (e.g., at (410)), provide the immediate power response desired through the electric machine, giving the active clearance control system time to increase the clearances (i.e., "loosen-up") enough to allow the turbomachine to accelerate through combustion.

Accordingly, for the exemplary aspect of the method 400 depicted, the method 400 further includes at (424) increasing, by the one or more computing devices, one or more clearances within the turbomachine using an active clearance control system in response to the received command to accelerate the turbomachine at (410). The one or more clearances may be turbine rotor blades clearances within, e.g., a high pressure turbine (and/or low pressure turbine) of the turbomachine. Specifically, for the embodiment exemplary aspect depicted, increasing, by the one or more computing devices, one or more clearances within the turbomachine using the active clearance control system at (424) includes at (426) increasing, by the one or more computing devices, one or more clearances within the turbomachine using the active clearance control system substantially simultaneously with providing, by the one or more computing devices, electrical power to the electric machine at (414). Furthermore, with such an exemplary aspect, increasing, by the one or more computing devices, one or more clearances within the turbomachine using the active clearance control system at (424) additionally includes at (428) maintaining, by the one or more computing devices, a fuel flow to a combustion section of the turbomachine substantially constant for an initial time period. Notably, as used herein, the term "substantially constant" may refer to less than a five percent variance from an initial value. For example, in at least certain exemplary aspects, maintaining, by the one or more computing devices, a fuel flow to a combustion section of the turbomachine substantially constant for the initial time period at (428) may accordingly include maintaining a rotational speed of a high pressure system of the turbomachine substantially constant for the initial time period and/or maintaining a temperature within a specific section of the turbomachine (e.g., an exhaust gas temperature) substantially constant for the initial time period.

The initial time period may be an amount of time sufficient for the active clearance control system to loosen up enough to allow the high pressure system of the turbomachine to accelerate. For example, in certain exemplary aspects, the initial time period may be at least about two seconds, such as at least about five seconds, such as up to about ten seconds, such as up to about five minutes.

Figure 9:
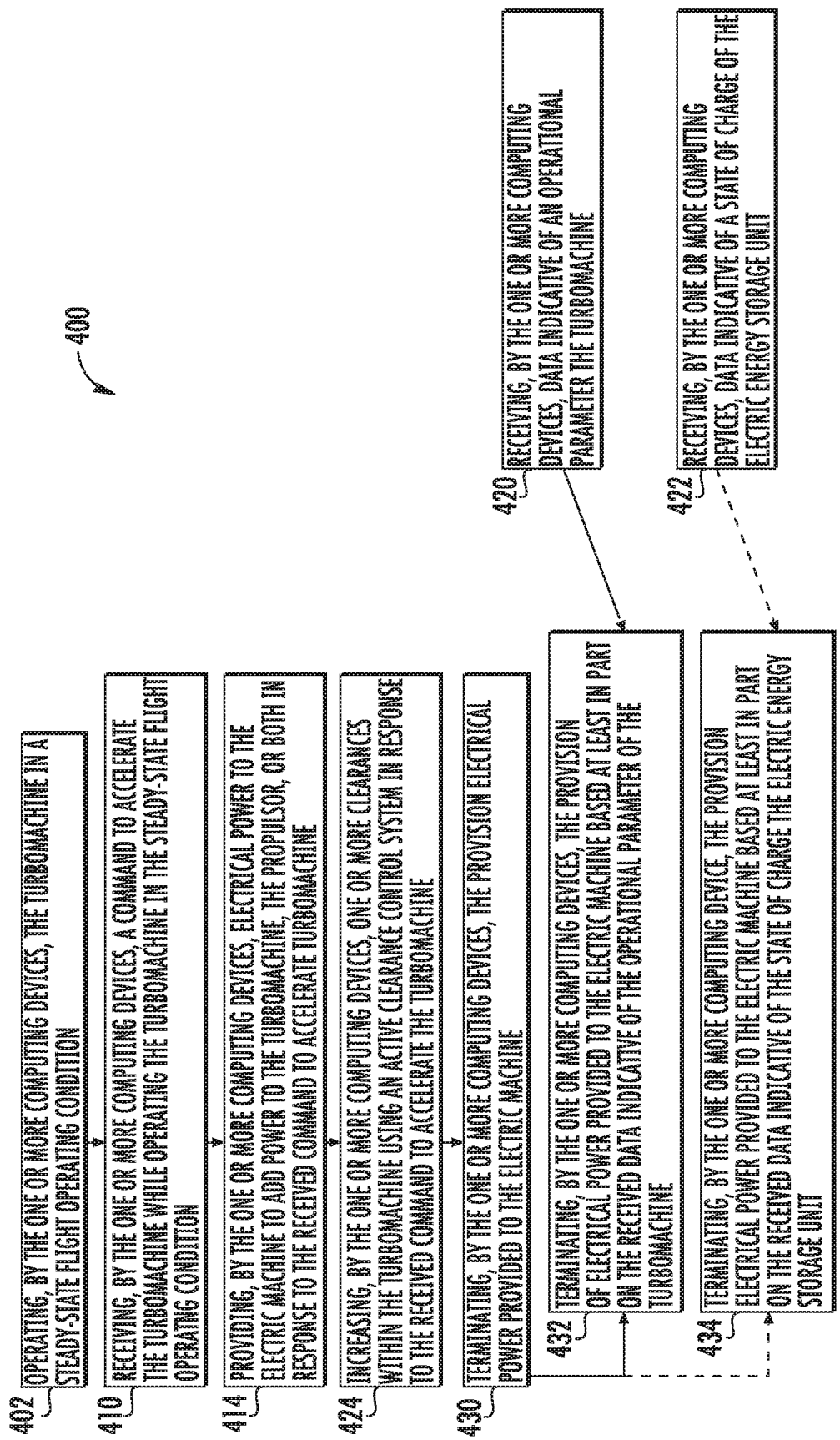
FIG. 9 is a flow diagram of another exemplary aspect of the exemplary method for operating a hybrid electric propulsion system of an aircraft of FIG. 7.

Furthermore, referring now also briefly to FIG. 9, providing another flowchart of an exemplary aspect of the method 400, the method 400 further includes at (430) terminating, by the one or more computing devices, the provision electrical power provided to the electric machine at (414) to add power to the turbomachine, the propulsor, or both in response to received command to accelerate the turbomachine. More specifically, for the exemplary aspect depicted, terminating, by the one or more computing devices, the provision of electrical power provided to the electric machine at (430) includes at (432) terminating, by the one or more computing devices, the provision of electrical power provided to the electric machine at (414) based at least in part on the received data indicative of the operational parameter of the turbomachine at (420). For example, the method 400 may determine the turbomachine is rotating at a desired speed, or operating a desired power level, and terminate the provision of electrical power to the electric machine based on such a determination.

Alternatively, however, in other exemplary aspects, the method 400 may terminate provision electrical power to the electric machine based on any other suitable determination. For example, in other exemplary aspects, terminating, by the one or more computing devices, the provision of electrical power provided to the electric machine at (430) may include, as is depicted in phantom, at (434) terminating, by the one or more computing device, the provision electrical power provided to the electric machine at (414) based at least in part on the received data indicative of the state of charge the electric energy storage unit at (422). For example, the method 400 may determine a charge level of the electric energy storage unit is below a predetermined threshold, or approaching a predetermined threshold, and terminate the provision electrical power to the electric machine based on such a determination.

Operating the hybrid electric propulsion system in accordance with one or more of the above exemplary aspects may provide for an overall more efficient hybrid electric propulsion system, and more specifically for a more efficient turbomachine.

Figure 10:
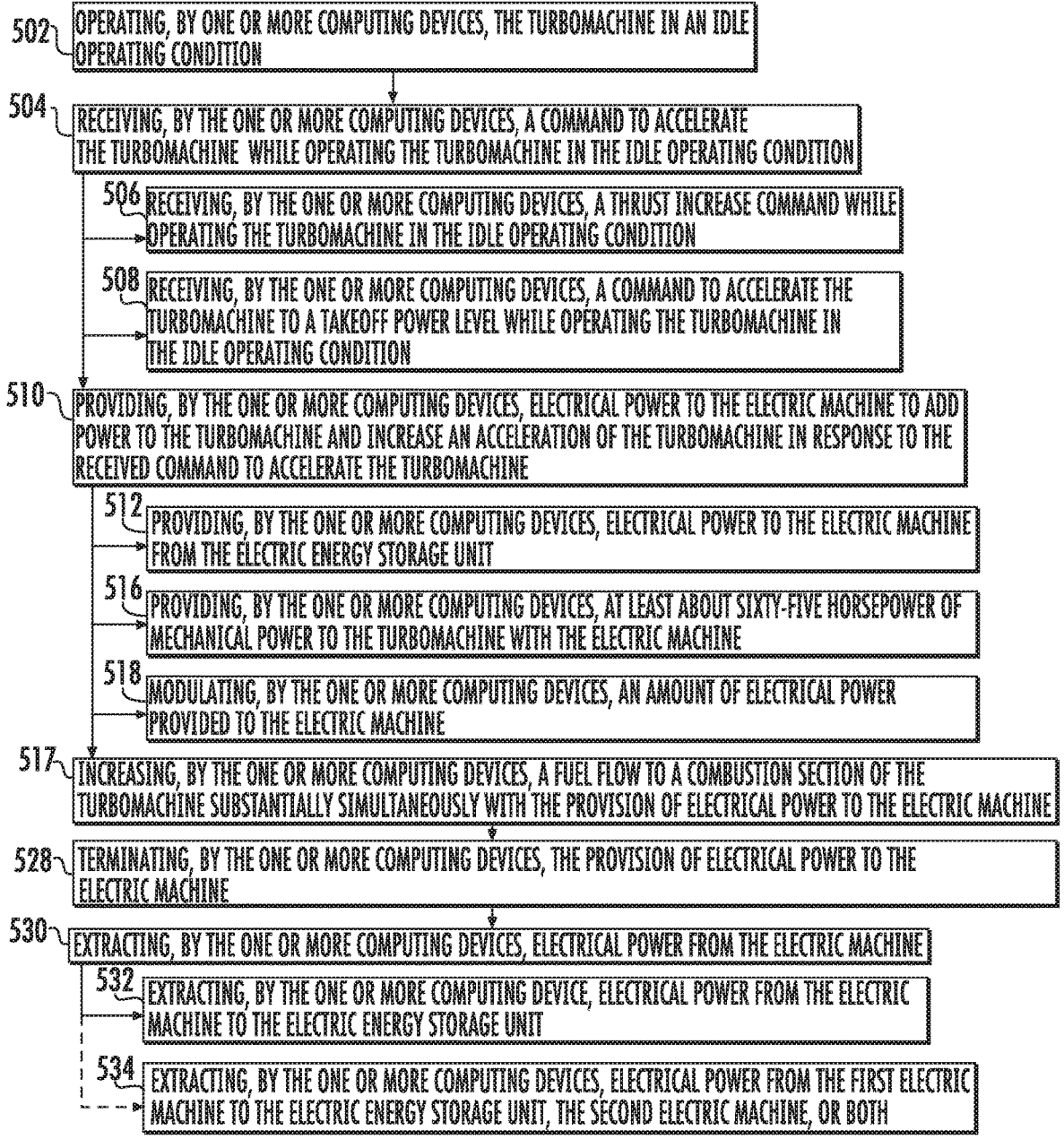
FIG. 10 is a flow diagram of a method for operating a hybrid electric propulsion system of an aircraft in accordance with an exemplary aspect of the present disclosure.

Referring now to FIG. 10, a flow diagram of a method 500 for operating a hybrid electric propulsion system of an aircraft in accordance with another exemplary aspect of the present disclosure is provided. The method 500 is similar to the exemplary method 300 described above with reference to FIG. 6, and accordingly may generally be operable with one or more of the exemplary hybrid electric propulsion systems described above with reference to FIGS. 1 through 5. For example, the hybrid electric propulsion system may generally include a turbomachine, a propulsor coupled to the turbomachine, and an electrical system, with the electrical system including an electric machine coupled to the turbomachine and an electric energy storage unit. The electric energy storage unit may be electrically connectable to the electric machine.

As is depicted, the method 500 includes operating, by one or more computing devices, the turbomachine such that the turbomachine rotates the propulsor, and more specifically includes at (502) operating, by one or more computing devices, the turbomachine in an idle operating condition. For example, in at least certain exemplary aspects, operating, by the one or more computing devices, the turbomachine in the idle operating condition at (502) may include taxiing the aircraft, positioning the aircraft for takeoff, holding the aircraft in a position for takeoff (or some other stationary position), etc.

Additionally, the method 500 includes receiving, by the one or more computing devices, a command to accelerate the turbomachine while operating the turbomachine, and more specifically includes at (504) receiving, by the one or more computing devices, a command to accelerate the turbomachine while operating the turbomachine in the idle operating condition at (502). For the exemplary aspect of the method 500 depicted, receiving, by the one or more computing devices, the command to accelerate the turbomachine while operating the turbomachine in the idle operating condition at (504) includes at (506) receiving, by the one or more computing devices, a thrust increase command while operating the turbomachine in the idle operating condition at (502) (i.e., a thrust increase command for the turbomachine), and more specifically, at (508) receiving, by the one or more computing devices, a command to accelerate the turbomachine to a takeoff power level while operating the turbomachine in the idle operating condition at (502). The thrust increase command received at (506) and/or the command to accelerate the turbomachine to the takeoff power received at (508) may be provided from, e.g., a flight crew of the aircraft via a throttle or other input device.

Moreover, the method 500 includes providing, by the one or more computing devices, electrical power to the electric machine to add power to the turbomachine, the propulsor, or both in response to the received command to accelerate the turbomachine, and more specifically includes at (510) providing, by the one or more computing devices, electrical power to the electric machine to add power to the turbomachine and increase an acceleration of the turbomachine in response to the received command to accelerate the turbomachine at (504). For the exemplary aspect depicted, providing, by the one or more computing devices, electrical power to the electric machine at (510) includes at (512) providing, by the one or more computing devices, electrical power to the electric machine from the electric energy storage unit. More specifically, for the exemplary aspect depicted, providing, by the one or more computing devices, electrical power to the electric machine at (510) includes at (516) providing, by the one or more computing devices, at least about fifteen horsepower of mechanical power to the turbomachine with the electric machine. For example, in at least certain exemplary aspects, providing, by the one or more computing devices, electrical power to the electric machine at (510) may further include providing at least about one hundred and twenty-five horsepower, such as at least about one hundred and fifty horsepower, such as up to about five thousand horsepower.

Notably, for the exemplary aspect depicted, the method 500 further includes at (517) increasing, by the one or more computing devices, a fuel flow to a combustion section of the turbomachine substantially simultaneously with the provision of electrical power to the electric machine at (510). For example, as used herein, the term "substantially simultaneously" may refer to within about thirty seconds of one another, such as within about fifteen seconds of one another, such as within about five seconds one another, such as within about two seconds of one another.

Furthermore, it should be appreciated, that for the exemplary aspect of the method 500 depicted in FIG. 10, providing, by the one or more computing devices, electrical power to the electric machine at (510) further includes at (518) modulating, by the one or more computing devices, an amount of electrical power provided to the electric machine. For example, the method 500 may modulate (i.e., increase or decrease) an amount of electrical power provided to the electric machine from, e.g., the electric energy storage unit through one or more power electronics or other suitable components.

Figure 11:
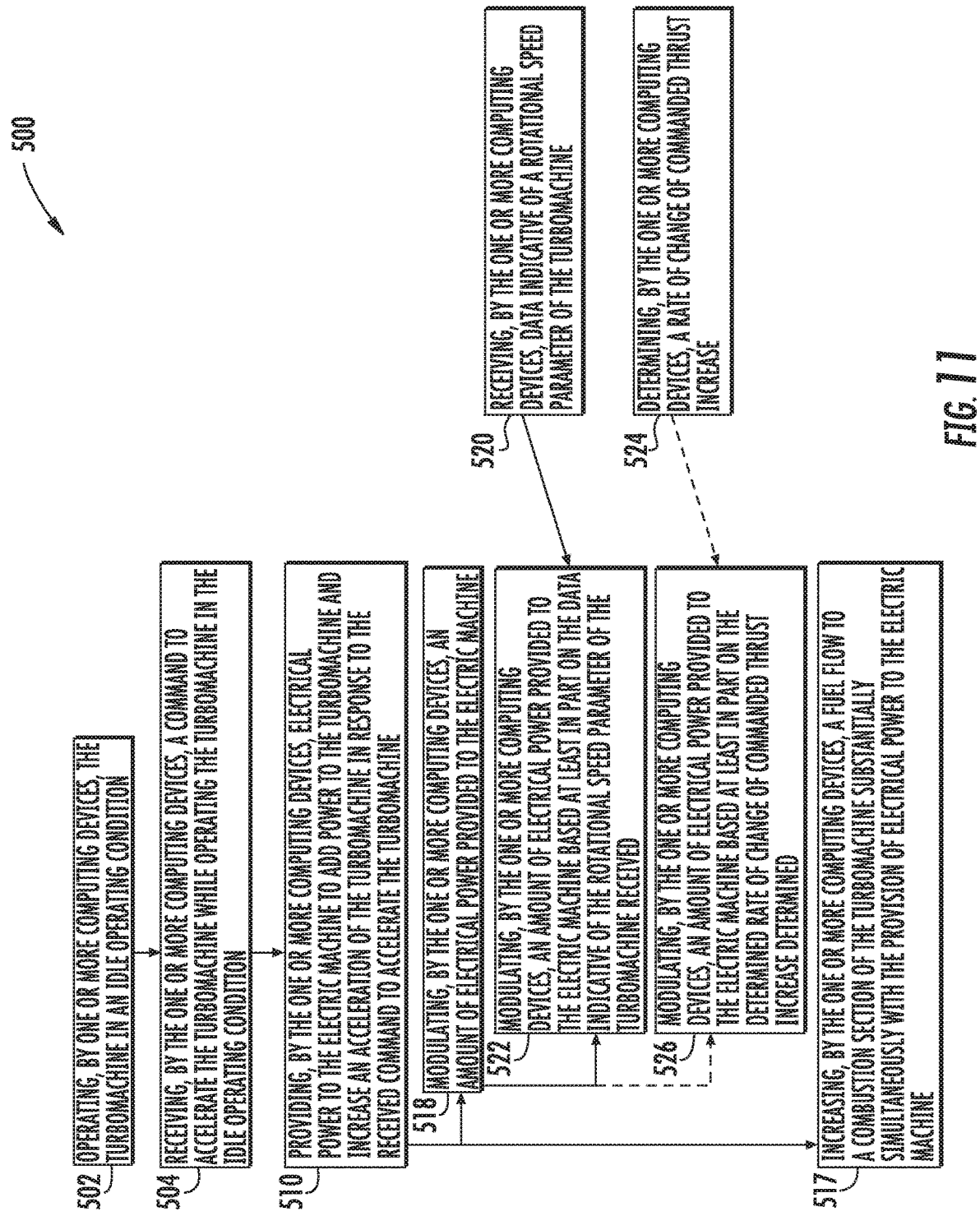
FIG. 11 is a flow diagram of an exemplary aspect of the exemplary method for operating a hybrid electric propulsion system of an aircraft of FIG. 10.

More specifically, referring now also to FIG. 11, providing a flow diagram of a more detailed exemplary aspect of the method 500 depicted for the exemplary aspect depicted, the method further includes at (520) receiving, by the one or more computing devices, data indicative of a rotational speed parameter of the turbomachine. The rotational speed parameter of the turbomachine may be a rotational speed of one or more components of the turbomachine, or an acceleration of one or more components of the turbomachine, or a combination of the two. Also, the one or more components may be, e.g., a high pressure spool of the turbomachine or a low pressure spool of the turbomachine. Accordingly, for the exemplary aspect depicted, modulating, by the one or more computing devices, the amount of electrical power provided to the electric machine at (518) further includes at (522) modulating, by the one or more computing devices, an amount of electrical power provided to the electric machine based at least in part on the data indicative of the rotational speed parameter of the turbomachine received at (520).

It should be appreciated, however, that in other exemplary aspects, the method 500 may instead modulate the amount of electrical power provided to the electric machine at (518) based on any other suitable indicator. For example, in addition to modulating the amount of electrical power provided to the electric machine based, e.g., on present operating conditions of the turbomachine (see, e.g., (532)), the method 500 may additionally, or alternatively, modulate the amount of electrical power provided to the electric machine at (518) in a manner indicative of an urgency at which the thrust is desired. For example, as previously discussed, in certain exemplary aspects, receiving, by the one or more computing device, the command to accelerate the turbomachine at (504) may include at (506) receiving, by the one or more computing devices, a thrust increase command. Moreover, as is depicted in phantom, in at least certain exemplary aspects, the method 500 may further include at (524) determining, by the one or more computing devices, a rate of change of commanded thrust increase (indicating, e.g., how quickly/an urgency at which increased thrust is desired). With such an exemplary aspect, modulating, by the one or more computing devices, the amount of electrical power provided to the electric machine at (518) may further include at (526) modulating, by the one or more computing devices, an amount of electrical power provided to the electric machine based at least in part on the determined rate of change of commanded thrust increase determined at (524).

Referring still to the exemplary aspect of the method 500 depicted in FIG. 10, the method 500 further includes at (528) terminating, by the one or more computing devices, the provision of electrical power to the electric machine. In certain exemplary aspects, terminating, by the one or more computing devices, the provision of electrical power to the electric machine at (528) may include terminating, by the one or more computing devices, the provision electrical power to the electric machine based on one or more of a rotational speed parameter of the turbomachine being above a determined threshold, an operability parameter of the turbomachine indicating the turbomachine is providing an amount of thrust over a determined threshold, etc. Furthermore, in still other exemplary aspects, terminating, by the one or more computing devices, the provision electrical power to the electric machine at (528) may include terminating, by the one or more computing devices, the provision of electrical power to the electric machine based on a determined state of charge of the electric energy storage unit being below a minimum threshold, a temperature of the electric machine being above an upper temperature threshold, etc.

Further, still, as is also depicted the method 500 further includes at (530) extracting, by the one or more computing devices, electrical power from the electric machine. More specifically, for the exemplary aspect of the method 500 depicted, extracting, by the one or more computing devices, electrical power from the electric machine at (530) includes at (532) extracting, by the one or more computing device, electrical power from the electric machine to the electric energy storage unit. Such extraction of electrical power at (530) may occur subsequent to the turbomachine meeting the acceleration demanded by the acceleration command received at (504), e.g., subsequent to the termination of electrical power to the electric machine at (528). For example, in certain exemplary aspects, the extraction electrical power at (530) may occur while the turbomachine is operating in a steady state operating condition (such as a cruise operating condition).

Notably, in other exemplary aspects, as stated, the propulsor may be a first propulsor, the electric machine may be a first electric machine, the hybrid electric propulsion system may further include a second propulsor, and the electrical system and further include a second electric machine coupled to the second propulsor. With such an exemplary aspect, as is also depicted in phantom, extracting, by the one or more computing devices, electrical power from the first electric machine at (530) may further include at (534) extracting, by the one or more computing devices, electrical power from the first electric machine to the electric energy storage unit, the second electric machine, or both. For example, in at least certain exemplary aspects, extracting, by the one or more computing devices, the electrical power from the first electric machine at (530) may include extracting, by the one or more computing devices, electrical power from the first electric machine to the second electric machine.

Operating a hybrid electric propulsion system in accordance with one or more of exemplary aspects described above with reference to FIGS. 9 and 10 may allow for the hybrid electric propulsion system to operate at a relatively low idle setpoint during idle operating conditions, while still being capable of providing a desired, relatively high level of acceleration during certain operations, such as takeoff. Such may lead to a reduction in fuel consumption and a reduction in premature wear on certain components of the aircraft, such as the brakes of the aircraft.

Figure 12:
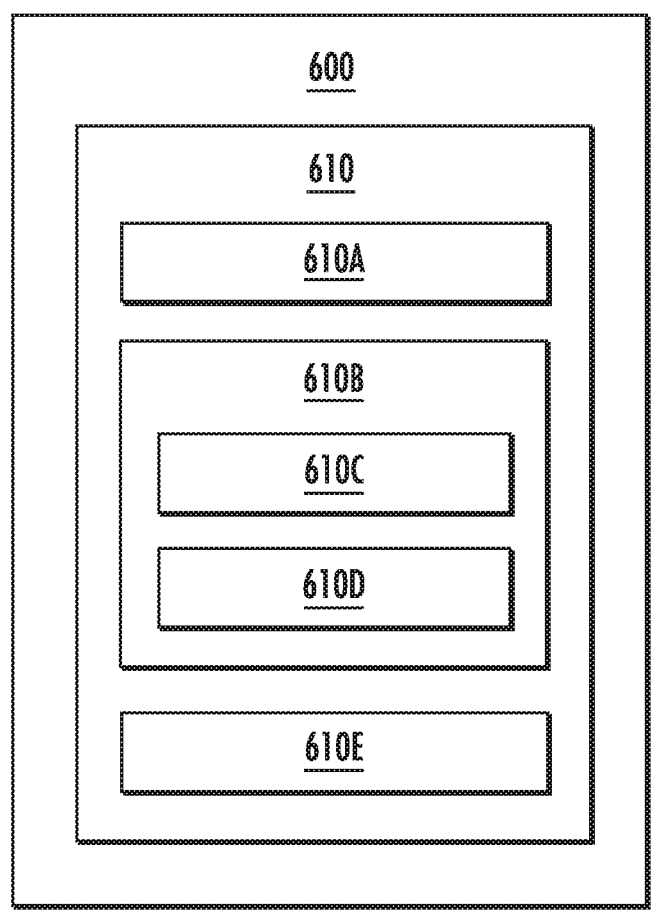
FIG. 12 is a computing system according to example aspects of the present disclosure.

Referring now to FIG. 12, an example computing system 600 according to example embodiments of the present disclosure is depicted. The computing system 600 can be used, for example, as a controller 72 in a hybrid electric propulsion system 50. The computing system 600 can include one or more computing device(s) 610. The computing device(s) 610 can include one or more processor(s) 610A and one or more memory device(s) 610B. The one or more processor(s) 610A can include any suitable processing device, such as a microprocessor, microcontroller, integrated circuit, logic device, and/or other suitable processing device. The one or more memory device(s) 610B can include one or more computer-readable media, including, but not limited to, non-transitory computer-readable media, RAM, ROM, hard drives, flash drives, and/or other memory devices.

The one or more memory device(s) 610B can store information accessible by the one or more processor(s) 610A, including computer-readable instructions 610C that can be executed by the one or more processor(s) 610A. The instructions 610C can be any set of instructions that when executed by the one or more processor(s) 610A, cause the one or more processor(s) 610A to perform operations. In some embodiments, the instructions 610C can be executed by the one or more processor(s) 610A to cause the one or more processor(s) 610A to perform operations, such as any of the operations and functions for which the computing system 600 and/or the computing device(s) 610 are configured, the operations for operating a turbomachine (e.g., methods 300, 400, 500), as described herein, and/or any other operations or functions of the one or more computing device(s) 610. Accordingly, the method 300 may be computer-implemented methods. The instructions 610C can be software written in any suitable programming language or can be implemented in hardware. Additionally, and/or alternatively, the instructions 610C can be executed in logically and/or virtually separate threads on processor(s) 610A. The memory device(s) 610B can further store data 610D that can be accessed by the processor(s) 610A. For example, the data 610D can include data indicative of power flows, data indicative of power demands of various loads in a hybrid electric propulsion system, data indicative of operational parameters of the hybrid electric propulsion system, including of a turbomachine of the hybrid electric propulsion system.

The computing device(s) 610 can also include a network interface 610E used to communicate, for example, with the other components of system 600 (e.g., via a network). The network interface 610E can include any suitable components for interfacing with one or more network(s), including for example, transmitters, receivers, ports, controllers, antennas, and/or other suitable components. One or more external display devices (not depicted) can be configured to receive one or more commands from the computing device(s) 610.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a hybrid-electric propulsion system of an aircraft, the hybrid-electric propulsion system comprising a propulsor, a turbomachine, and an electrical system, the electrical system comprising an electric machine coupled to the turbomachine, the method comprising:
   operating, by one or more computing devices, the turbomachine such that the turbomachine rotates the propulsor;
   receiving, by the one or more computing devices, a command to accelerate the turbomachine while operating the turbomachine;
   maintaining a rotational speed of a high pressure system of the turbomachine substantially constant for an initial time period in response to the received command to accelerate the turbomachine, maintaining a temperature within the turbomachine substantially constant for the initial time period, or both; and
   providing, by the one or more computing devices, electrical power to the electric machine to add power to the turbomachine, the propulsor, or both in response to the received command to accelerate the turbomachine.

2. The method of claim 1, wherein the hybrid electric propulsion system further comprises an electric energy storage unit, wherein providing, by the one or more computing devices, electrical power to the electric machine comprises providing, by the one or more computing devices, electrical power to the electric machine from the electric energy storage unit.

3. The method of claim 2, wherein providing, by the one or more computing devices, electrical power to the electric machine from the electric energy storage unit comprises providing, by the one or more computing devices, at least about fifteen horsepower of mechanical power to the turbomachine, the propulsor, or both with the electric machine.

4. The method of claim 1, wherein operating, by the one or more computing devices, the turbomachine comprises operating, by the one or more computing devices, the turbomachine in a steady-state flight operating condition.

5. The method of claim 4, further comprising:
   maintaining, by the one or more computing devices, a fuel flow to a combustion section of the turbomachine substantially constant for an initial time period in response to the received command to accelerate the turbomachine.

6. The method of claim 4, further comprising:
increasing, by the one or more computing devices, one or more clearances within the turbomachine using an active clearance control system of the turbomachine in response to the received command to accelerate the turbomachine.

7. The method of claim 4, further comprising:
maintaining, by the one or more computing devices, a fuel flow to a combustion section of the turbomachine substantially constant for an initial time period in response to the received command to accelerate the turbomachine, and wherein increasing, by the one or more computing devices, the one or more clearances within the turbomachine using the active clearance control system comprises increasing, by the one or more computing devices, the one or more clearances within the turbomachine using the active clearance control system substantially simultaneously with maintaining, by the one or more computing devices, the fuel flow to the combustion section of the turbomachine substantially constant for the initial time period.

8. The method of claim 7, wherein increasing, by the one or more computing devices, the one or more clearances within the turbomachine using the active clearance control system comprises increasing, by the one or more computing devices, the one or more clearances within the turbomachine using the active clearance control system substantially simultaneously with providing, by the one or more computing devices, electrical power to the electric machine.

9. The method of claim 4, wherein operating, by one or more computing devices, the turbomachine in the steady-state flight operating condition comprises extracting, by the one or more computing devices, electrical power from the electric machine.

10. The method of claim 1, wherein operating, by the one or more computing devices, the turbomachine comprises operating, by the one or more computing devices, the turbomachine in an idle operating condition.

11. The method of claim 10, wherein receiving, by the one or more computing devices, the command to accelerate the turbomachine while operating the turbomachine in the idle operating condition comprises receiving, by the one or more computing devices, a command to accelerate the turbomachine to a takeoff power level while operating the turbomachine in the idle operating condition.

12. The method of claim 10, receiving, by the one or more computing devices, the command to accelerate the turbomachine while operating the turbomachine in the idle operating condition comprises receiving, by the one or more computing devices, a thrust increase command.

13. The method of claim 12, wherein receiving, by the one or more computing devices, the command to accelerate the turbomachine further comprises determining, by the one or more computing devices, a rate of change of commanded thrust increase, and wherein providing, by the one or more computing devices, electrical power to the electric machine comprises modulating, by the one or more computing devices, an amount of electrical power provided to the electric machine based at least in part on the determined rate of change of commanded thrust increase.

14. The method of claim 1, further comprising:
receiving, by the one or more computing devices, data indicative of an operational parameter of the turbomachine, and wherein providing, by the one or more computing devices, electrical power to the electric machine comprises modulating, by the one or more computing devices, an amount of electrical power provided to the electric machine based at least in part on the received data indicative of the operational parameter of the turbomachine.

15. The method of claim 1, further comprising:
receiving, by the one or more computing devices, data indicative of an operational parameter of the turbomachine; and
terminating, by the one or more computing devices, the provision of electrical power to the electric machine based at least in part on the received data indicative of the operational parameter of the turbomachine.

16. The method of claim 1, wherein the hybrid electric propulsion system further comprises an electric energy storage unit, and wherein the method further comprises:
receiving, by the one or more computing devices, data indicative of a state of charge of the electric energy storage unit, and wherein providing, by the one or more computing devices, electrical power to the electric machine comprises modulating, by the one or more computing devices, an amount of electrical power provided to the electric machine based at least in part on the received data indicative of the state of charge of the electric energy storage unit.

17. The method of claim 1, wherein the hybrid electric propulsion system further comprises an electric energy storage unit, and wherein the method further comprises:
receiving, by the one or more computing devices, data indicative of a state of charge of the electric energy storage unit; and
terminating, by the one or more computing devices, the provision of electrical power to the electric machine based at least in part on the received data indicative of the state of charge of the electric energy storage unit.

18. A hybrid-electric propulsion system for an aircraft comprising:
a propulsor;
a turbomachine coupled to the propulsor for driving the propulsor and generating thrust;
an electrical system comprising an electric machine and an electric energy storage unit electrically connectable to the electric machine, the electric machine coupled to the turbomachine; and
a controller configured to receive a command to accelerate the turbomachine while operating the turbomachine and provide electrical power to the electric machine to add power to the turbomachine, the propulsor, or both in response to the received command to accelerate the turbomachine, wherein the controller is further configured to receive data indicative of a state of charge of the electric energy storage unit and terminate the provision of electrical power to the electric machine based at least in part on the received data indicative of the state of charge of the electric energy storage unit.

19. The hybrid-electric propulsion system of claim 18, further comprising:
an electric energy storage unit, wherein in providing electrical power to the electric machine the controller is configured to provide electrical power to the electric machine from the electric energy storage unit.

20. A method for operating a hybrid-electric propulsion system of an aircraft, the hybrid-electric propulsion system comprising a propulsor, a turbomachine, and an electrical system, the electrical system comprising an electric machine coupled to the turbomachine, the method comprising:
operating, by one or more computing devices, the turbomachine such that the turbomachine rotates the propulsor;

receiving, by the one or more computing devices, a command to accelerate the turbomachine while operating the turbomachine;
determining, by the one or more computing devices, a rate of change of commanded thrust increase; and
modulating, by the one or more computing devices, an amount of electrical power provided to the electric machine based at least in part on the determined rate of change of commanded thrust increase.

* * * * *